(12) United States Patent
Taherzadeh Boroujeni et al.

(10) Patent No.: US 12,489,666 B2
(45) Date of Patent: Dec. 2, 2025

(54) PEAK TO AVERAGE POWER RATIO REDUCTION FOR ORTHOGONAL FREQUENCY DIVISION MULTIPLEXING

(71) Applicant: QUALCOMM Incorporated, San Diego, CA (US)

(72) Inventors: Mahmoud Taherzadeh Boroujeni, San Diego, CA (US); Morteza Soltani, San Diego, CA (US); Peter Gaal, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 360 days.

(21) Appl. No.: 18/334,150

(22) Filed: Jun. 13, 2023

(65) Prior Publication Data

US 2024/0422040 A1    Dec. 19, 2024

(51) Int. Cl.
*H04L 27/26* (2006.01)
*H04W 72/20* (2023.01)

(52) U.S. Cl.
CPC ...... *H04L 27/2614* (2013.01); *H04L 27/2602* (2013.01); *H04L 27/2636* (2013.01); *H04W 72/20* (2023.01)

(58) Field of Classification Search
CPC . H04L 27/2614; H04L 27/2636; H04W 72/20
See application file for complete search history.

(56) References Cited

U.S. PATENT DOCUMENTS

2020/0313732 A1\* 10/2020 Yang ................. H04W 72/0473
2021/0359890 A1\* 11/2021 Sahraei ............... H04L 27/2614

\* cited by examiner

*Primary Examiner* — Duc C Ho
(74) *Attorney, Agent, or Firm* — Patterson & Sheridan, LLP

(57) ABSTRACT

Certain aspects of the present disclosure provide techniques for peak to average power ratio (PAPR) reduction for orthogonal frequency division multiplexing (OFDM). An example method, performed at a transmitter, includes generating a plurality of orthogonal frequency division multiplexed (OFDM) symbols, based on a constellation associated with a modulation scheme, adjusting a phase of at least one of the OFDM symbols based on at least one parameter that depends on a non-integer multiple of a phase distance between two points on the constellation, generating a Discrete Fourier Transform spread OFDM (DFT-s-OFDM) waveform based on the OFDM symbols after the adjustment, and transmitting the DFT-s-OFDM waveform to a receiver.

38 Claims, 21 Drawing Sheets

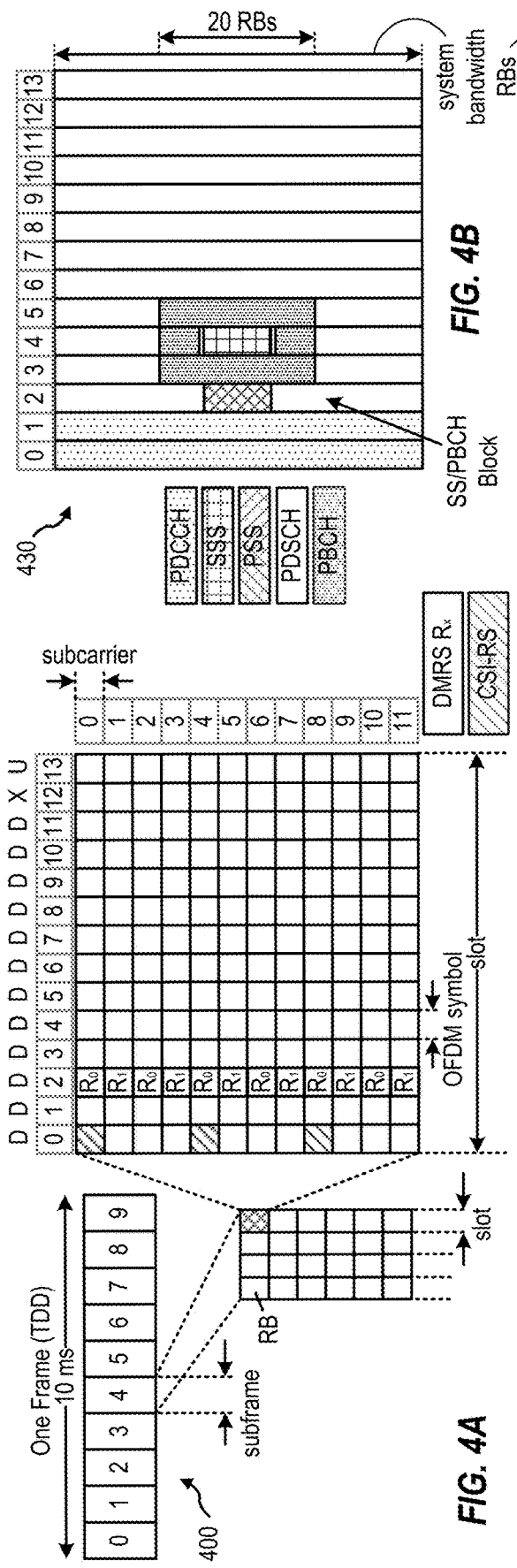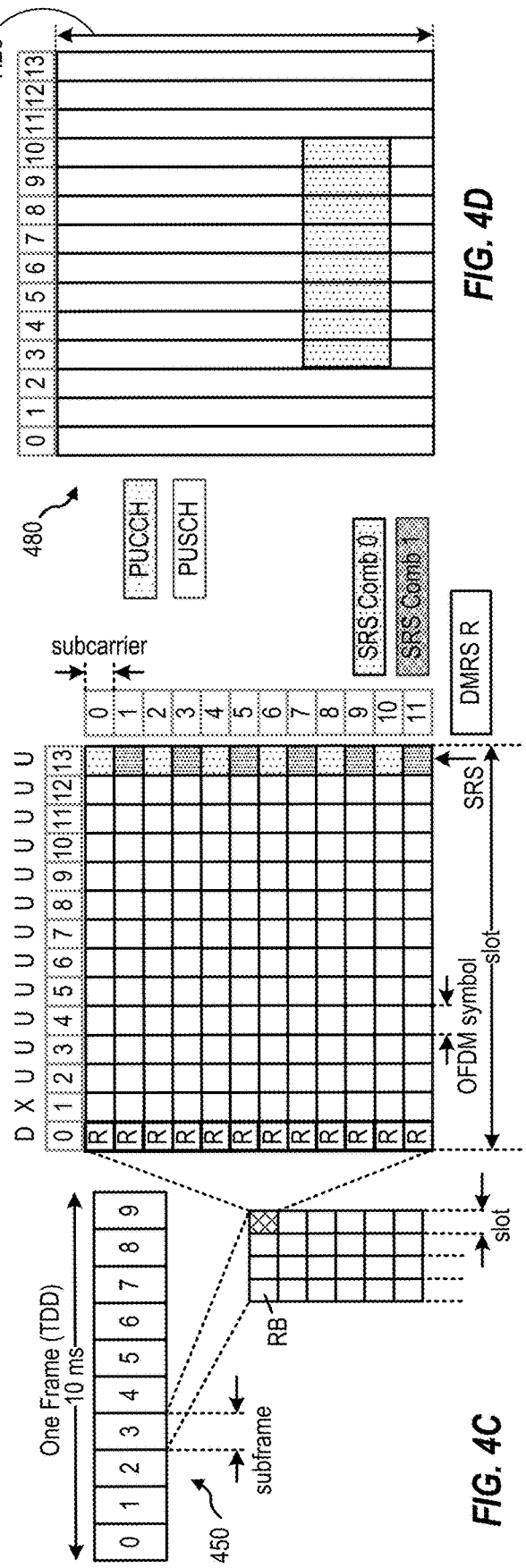

PEAK TO AVERAGE POWER RATIO REDUCTION FOR ORTHOGONAL FREQUENCY DIVISION MULTIPLEXING

BACKGROUND

Field of the Disclosure

Aspects of the present disclosure relate to wireless communications, and more particularly, to techniques for peak to average power ratio (PAPR) reduction for orthogonal frequency division multiplexing (OFDM) waveforms.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a transmitter. The method includes generating a plurality of orthogonal frequency division multiplexed (OFDM) symbols, based on a constellation associated with a modulation scheme; adjusting a phase of at least one of the OFDM symbols based on at least one parameter that depends on a non-integer multiple of a phase distance between two points on the constellation; generating a Discrete Fourier Transform spread OFDM (DFT-s-OFDM) waveform based on the OFDM symbols after the adjustment; and transmitting the DFT-s-OFDM waveform to a receiver.

Another aspect provides a method for wireless communications at a transmitter. The method includes generating a plurality of orthogonal frequency division multiplexed (OFDM) symbols, based on a constellation associated with a modulation scheme; adjusting a phase of at least one of the OFDM symbols based on at least one parameter that depends on a non-integer multiple of a phase distance between two points on the constellation; generating a cyclic prefix OFDM (CP-OFDM) waveform based on the OFDM symbols after the adjustment; and transmitting the CP-OFDM waveform to a receiver.

Another aspect provides a method for wireless communications at a transmitter. The method includes generating a plurality of orthogonal frequency division multiplexed (OFDM) symbols, based on a constellation associated with a modulation scheme; adjusting a phase of at least one of the OFDM symbols based on at least one parameter, wherein a value of the at least one parameter is dynamically indicated for a transmission occasion, instance, or block of data; generating a cyclic prefix OFDM (CP-OFDM) waveform based on the OFDM symbols after the adjustment; and transmitting the CP-OFDM waveform to a receiver.

Another aspect provides a method for wireless communications at a transmitter. The method includes generating a plurality of orthogonal frequency division multiplexed (OFDM) symbols, based on a constellation associated with a modulation scheme; adjusting a phase of at least one of the OFDM symbols based on at least one parameter, wherein a value of the at least one parameter is dynamically indicated for a transmission occasion, instance, or block of data; generating a Discrete Fourier Transform spread OFDM (DFT-s-OFDM) waveform based on the OFDM symbols after the adjustment; and transmitting the DFT-s-OFDM waveform to a receiver.

Another aspect provides a method for wireless communications at a receiver. The method includes receiving a Discrete Fourier Transform spread OFDM (DFT-s-OFDM) waveform from a transmitter; and extracting a plurality of orthogonal frequency division multiplexed (OFDM) symbols from the DFT-s-OFDM waveform, based on a constellation associated with a modulation scheme and a phase adjustment determined by at least one parameter that depends on a non-integer multiple of a phase distance between two points on the constellation.

Another aspect provides a method for wireless communications at a receiver. The method includes receiving a cyclic prefix OFDM (CP-OFDM) waveform from a transmitter; and extracting a plurality of orthogonal frequency division multiplexed (OFDM) symbols from the CP-OFDM waveform, based on a constellation associated with a modulation scheme and a phase adjustment determined by at least one parameter that depends on a non-integer multiple of a phase distance between two points on the constellation.

Another aspect provides a method for wireless communications at a receiver. The method includes receiving a cyclic prefix OFDM (CP-OFDM) waveform from a transmitter; and extracting a plurality of orthogonal frequency division multiplexed (OFDM) symbols from the CP-OFDM waveform, based on a constellation associated with a modulation scheme and a phase adjustment determined by at least one parameter, wherein a value of the at least one parameter is dynamically indicated for a transmission occasion, instance, or block of data.

Another aspect provides a method for wireless communications at a receiver. The method includes receiving a Discrete Fourier Transform spread OFDM (DFT-s-OFDM) waveform from a transmitter; and extracting a plurality of orthogonal frequency division multiplexed (OFDM) symbols from the DFT-s-OFDM waveform, based on a constellation associated with a modulation scheme and a phase adjustment determined by at least one parameter, wherein a value of the at least one parameter is dynamically indicated for a transmission occasion, instance, or block of data.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
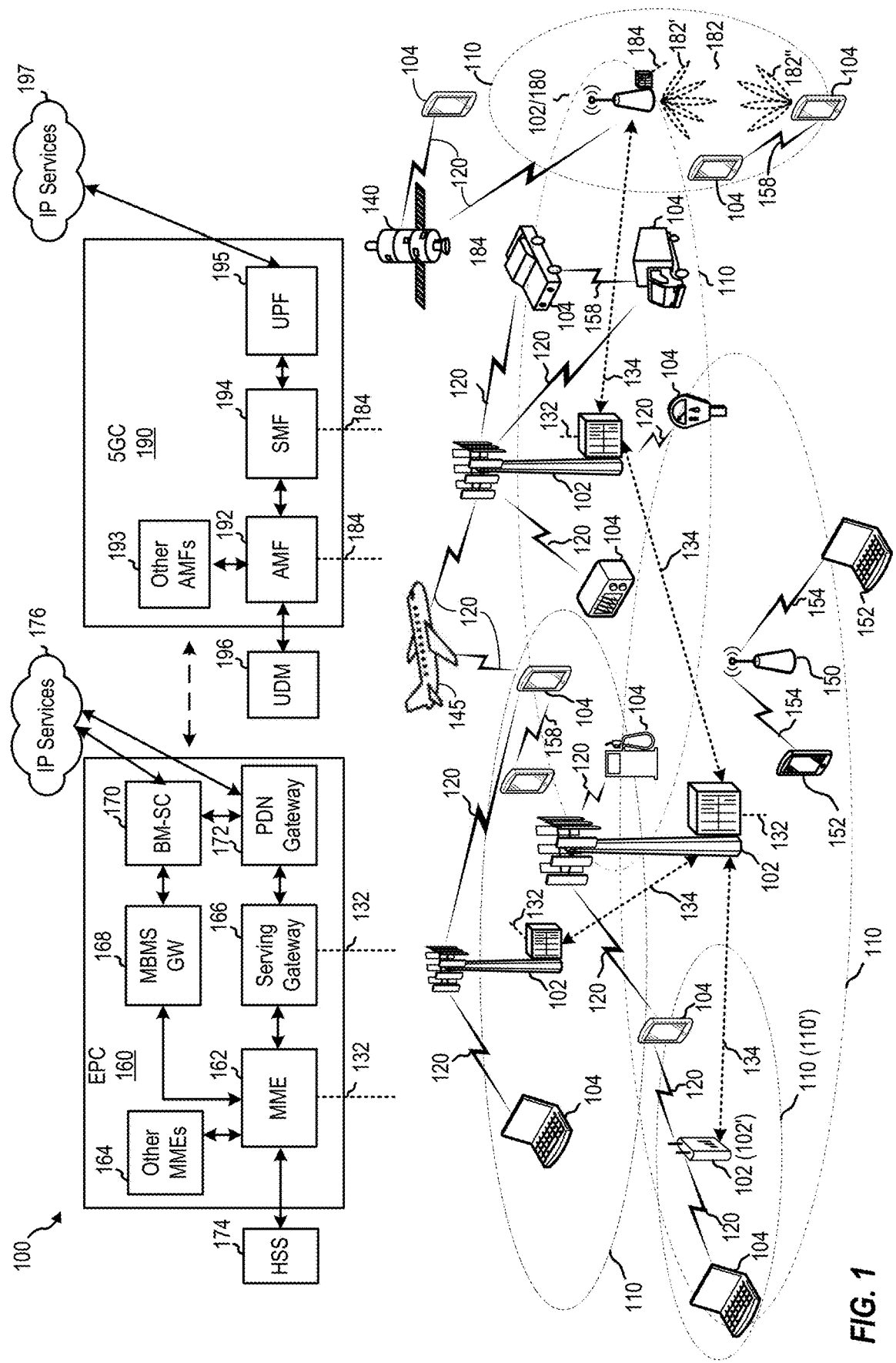
FIG. 1 depicts an example wireless communications network.

Aspects of the present disclosure provide apparatuses, methods, processing systems, and computer-readable mediums for peak to average power ratio (PAPR) reduction for orthogonal frequency division multiplexing (OFDM).

OFDM (Orthogonal Frequency Division Multiplexing) is a modulation technique widely used in modern communication systems. Different OFDM techniques, such as Discrete Fourier transform spread OFDM (DFT-s-OFDM) and cyclic prefix (CP)-OFDM, divide the available frequency spectrum into multiple orthogonal subcarriers, each carrying a portion of the data. By using these subcarriers, OFDM achieves robustness against frequency-selective fading and enables high data rates. In OFDM, the input data stream is divided into parallel streams and each stream is modulated onto the corresponding subcarrier using various modulation schemes (e.g., Quadrature Amplitude Modulation (QAM) or Phase Shift Keying (PSK)). The modulated subcarriers are then combined to form the OFDM symbol, which is transmitted over the channel. At the receiver, the OFDM symbol is demodulated and the individual subcarriers are extracted to recover the original data.

Peak to average power ratio (PAPR) is an important aspect of modulation and waveform design in wireless systems (e.g., OFDM in 5G and future 6G). PAPR is a metric that quantifies the dynamic range or power fluctuations of an OFDM signal. It represents the ratio between the peak power level and the average power level of the signal. Due to the nature of OFDM, where multiple subcarriers are added together, the individual subcarriers can constructively interfere with each other, resulting in occasional large power peaks in the composite signal. These power peaks can lead to signal distortion, increased power requirements, and potential nonlinear distortions in the transmitter or power amplifier.

Managing PAPR is important in OFDM systems for several reasons. Firstly, high PAPR can cause distortion and non-linearities in the transmitter and/or power amplifiers, leading to increased intermodulation products and spectral regrowth. This can degrade the signal quality and result in interference with neighboring frequency bands. Secondly, high PAPR requires the transmitter to operate with a large dynamic range, leading to increased power consumption and reduced efficiency. Additionally, high PAPR can result in a higher bit error rate (BER) since the power peaks may exceed the nonlinear operating range of the receiver. Therefore, PAPR reduction techniques may be employed in OFDM systems to mitigate these issues.

DFT-s-OFDM outperforms CP-OFDM in terms of PAPR in certain cases, and thus, may be more useful when a UE has coverage problems. For example, by using DFT-S-OFDM, a UE can apply smaller power backoff (e.g., or none at all) than when using CP-OFDM, because of smaller PAPR.

DFT-S-OFDM still has some potential PAPR issues, even though it typically has better PAPR than CP-OFDM. For example, even though other symbols have zero interference (e.g., and thus do not add to the amplitude) at the sampling points, at other points of time, sidelobes of other symbols can be added constructively, which may result in high amplitude at some points causing high PAPR. Certain techniques, such as pulse shaping or spectrum extension may help address this potential issue, but at the cost of added complexity.

Aspects of the present disclosure provide fractional phase ramp based techniques (e.g., including phase steps obtained from irrational algebraic numbers) which provide PAPR improvement without relying on pulse shaping or spectrum extension, without impact on error vector magnitude (EVM), with minimal complexity, and without a requirement for dynamic signaling. For example, in some aspects, these techniques may involve rotating the k'th symbol with a phase of θ*k, where θ may be a non-integer (e.g., fractional) multiple of half of a phase distance between two constellation points (e.g. half of the minimum phase difference among all constellation points). In some aspects, these techniques may include dynamic signaling of the parameter θ, because the small extra overhead of dynamic signaling may provide significant improvement in PAPR in some scenarios.

While PAPR improvement for DFT-S-OFDM is a concern, PAPR improvement may be even more of a concern for CP-OFDM. As noted above, DFT-S-OFDM outperforms CP-OFDM in terms of PAPR, but for many other reasons (e.g. more simplicity in combination with MIMO and more flexibility in frequency allocation), CP-OFDM is still used for most cases in UL NR (and for DL NR, where it is the only option). Thus, it may be useful to apply the techniques described above for PAPR reduction in CP-OFDM, with and without dynamic signaling, without relying on pulse shaping or spectrum extension, and with minimal complexity.

Such techniques may achieve significant PAPR improvements in DFT-S-OFDM and CP-OFDM, without any pulse shaping, spectrum extension, or EVM impact. Utilization of the techniques described herein may improve system performance, spectral efficiency, and power efficiency of wireless communications systems.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
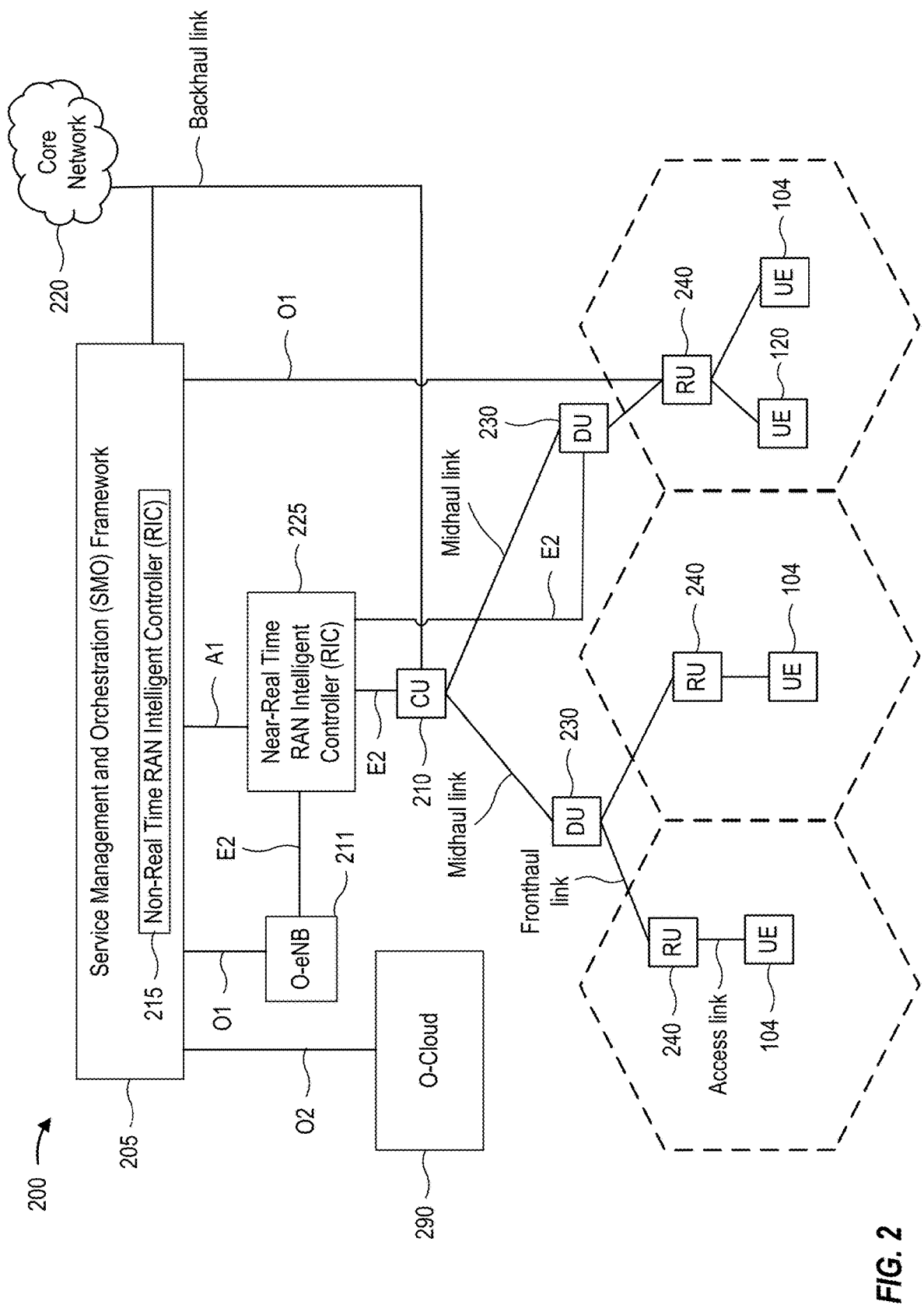
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHZ-52,600 MHZ, which is sometimes referred to (interchangeably) as a "millimeter wave" ("mmW" or "mm Wave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
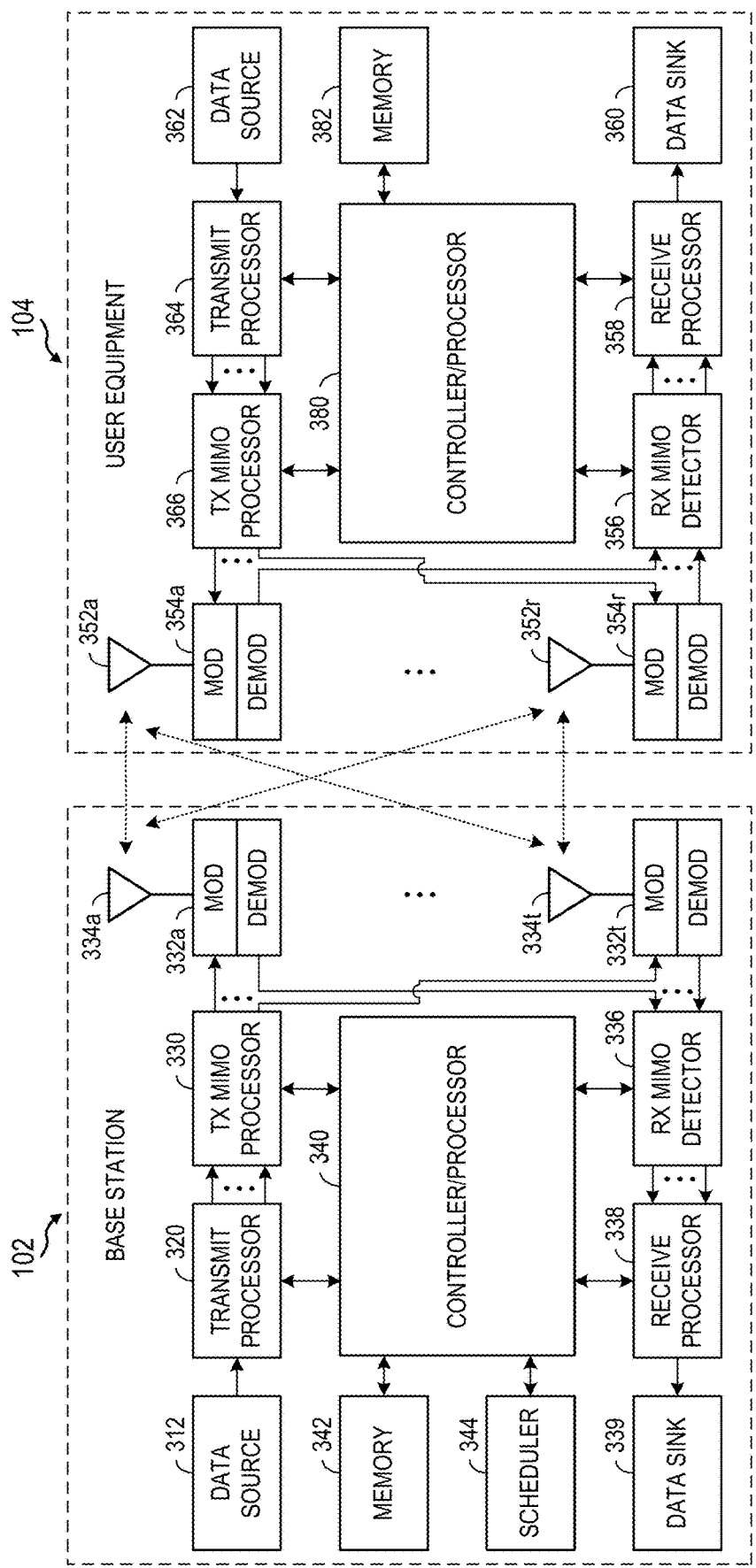
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 2μ slots/subframe. The subcarrier spacing and symbol length/duration are a function of the numerology. The subcarrier spacing may be equal to $2^{\mu} \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to PAPR Reduction for OFDM

As noted above, managing PAPR is a concern in various OFDM systems (e.g., DFT-s-OFDM and CP-OFDM) for several reasons.

As noted above, while DFT-s-OFDM typically outperforms CP-OFDM in terms of PAPR, it may still have some issues, for example, for Phase Shift Keying (PSK) constellation types. For example, even though other symbols have zero interference (e.g., and thus don't add to the amplitude) at the sampling points, at other points of time, sidelobes of other symbols can be added constructively, which may result in high amplitude at some points causing high PAPR. The largest component of this issue is from the adjacent symbol, which can become the dominant factor when aggressive pulse shaping is applied, which effectively eliminates the tail of more distant symbols. Other more distant symbols can also contribute the PAPR, and their aggregate constructive addition can become a major issue (e.g., especially when no pulse shaping and/or no spectrum extension is applied).

Aspects of the present disclosure may take advantage of certain OFDM waveform characteristics to help reduce PAPR. For example, the effect of constructive addition of sidelobes of all other symbols may occur when their associated constellation point(s) for all symbols with even distance (e.g., for a given symbol time) coincide (e.g., or are close to that constellation point in the complex plane) and associated constellation point(s) for all symbols with odd (e.g., symbol time) distance coincide with its negative complex point (e.g., or are close to that). A similar effect (e.g., but with smaller magnitude) may occur because of constructive addition of sidelobes from symbols of any arithmetic sequence (e.g., arithmetic progression), and the magnitude of its effect is inversely related to the step size of that arithmetic sequence (e.g., aka its common difference).

When two symbols have a time difference of q symbols and their corresponding constellation points differ by a phase q*ε, the adverse effect of the constructive addition of their sidelobes is inversely related (e.g., not inversely proportional) to how close ε*q is to an integer multiple of phase differences of adjacent constellation points (e.g., a multiple of π for BPSK, and a multiple of π/2 for QPSK) and how small q is.

Considering the ratio of & to that minimum phase distance of constellation point as α, then the problem of choosing a phase ramp step (size) becomes the problem of choosing a real value α where q*α is not too close (e.g., or as far as possible) to p for all integer numbers of p and q (e.g., where avoiding this closeness is more important for smaller values of q).

For DFT-S-OFDM, without pulse shaping, the amplitude of distant sidelobes decays proportional to 1/q (where q is the distance in terms of number of symbols). Therefore, the main problem may become how the quantity |p−α*q| scales with q (or how $$\left|\alpha - \frac{p}{q}\right|$$

scales with q). This may essentially be related to what is referred to as a Diophantine approximation of α (e.g., how well can α be approximated by p/q for some small value of q, or alternatively how fast $$\left|\alpha - \frac{p}{q}\right|$$

goes to zero when q grows).

For more aggressive pulse shaping (e.g., not sinc pulse shaping), because the amplitude of distance sidelobes decays faster than 1/q, their constructively added amplitude (e.g., even with exactly the same phase) is convergent. Thus, in this case, the phase differences of the closer sidelobes is more important than the scaling of this difference with q.

Irrational algebraic numbers have poor scaling bound in terms of the Diophantine approximation (e.g., which is best for the problem finding phase ramp stem for reducing PAPR in DFT-S-OFDM). For all irrational numbers, their Diophantine approximation satisfies the following upper bound (e.g., Hurwitz's theorem):

$$\left|\alpha - \frac{p}{q}\right| < \frac{1}{\sqrt{5}q^2}$$

Among irrational algebraic numbers, it is known that the golden ratio:

$$\Phi = \frac{1+\sqrt{5}}{2}$$

(or its equivalent real numbers, (a*Φ+b)/(c*Φ+d) for some integer numbers a, b, c, d) has the worst Diophantine approximation and all other irrational numbers satisfy a more stringent upper bound for their Diophantine approximation:

$$\left|\alpha - \frac{p}{q}\right| < \frac{1}{\sqrt{8}q^2}$$

In practice, it may be enough to use an approximation of these irrational algebraic numbers as the step size for the phase ramp. The required accuracy can depend on how symbols are generated in the data steam (e.g., which may depend on time and frequency allocation of DFT-S-OFDM data). The required accuracy may also depends on whether we are interested in more extreme values of PAPR distribution or more interested in its mid-range or cubic metric.

A variant of Binary Phase Shift Keying (BPSK), π/2-BPSK (e.g., which rotates every other BPSK symbol by a rotation of π/2) may provide PAPR improvements over regular BPSK (e.g., when used with DFT-S-OFDM), by reducing the adverse effect of the main sidelobe (e.g., from the adjacent symbols). A variant of Quadrature Phase Shift Keying (QPSK), π/4-QPSK (e.g., which rotates every other QPSK symbol by a rotation of π/4) may provide some PAPR improvement when used with aggressive pulse shaping or spectrum extension. However, π/4-QPSK may not provide PAPR improvement without pulse shaping or spectrum extension. Aspects of the present disclosure may help improve PAPR of DFT-S-OFDM, such that it is beneficial for QPSK (e.g., and potentially larger constellations) without the added complexity of relying on pulse shaping or spectrum extension.

Aspects of the present disclosure provide fractional/non-integer phase ramp based techniques (e.g., including phase steps obtained from irrational algebraic numbers) which provides PAPR improvement without relying on pulse shaping or spectrum extension, and without impact on error vector magnitude (EVM), and with minimal complexity and without a requirement for dynamic signaling. For example, in some aspects, these techniques may involve rotating the k'th symbol with a phase of θ*k, where θ may be a non-integer (e.g., fractional) multiple of half of a phase distance between two constellation points (e.g. half of the minimum phase difference among all constellation points). In some aspects, these techniques may include dynamic signaling of the parameter θ, because the small extra overhead of dynamic signaling may provide significant improvement in PAPR in some scenarios.

For example, in some aspects, these techniques may involve rotating the k'th symbol with a phase of θ*k, where θ is a fraction or a non-integer multiple of half of a phase distance between two constellation points (e.g. half of the minimum phase difference among all constellation points). Such techniques may achieve up to 0.4 dB PAPR improvements in DFT-S-OFDM, without any pulse shaping, spectrum extension, or EVM impact.

While PAPR improvement for DFT-S-OFDM is important, PAPR improvement may be even more important for CP-OFDM. As noted above, DFT-S-OFDM typically outperforms CP-OFDM in terms of PAPR, but for many other reasons (e.g. more simplicity in combination with MIMO and more flexibility in frequency allocation), CP-OFDM is still used for most cases in UL NR (and for DL NR, where it is the only option). Thus, it may be useful to apply the techniques described above for PAPR reduction in CP-OFDM, with and without dynamic signaling, without relying on pulse shaping or spectrum extension, and with minimal complexity.

Figure 5:
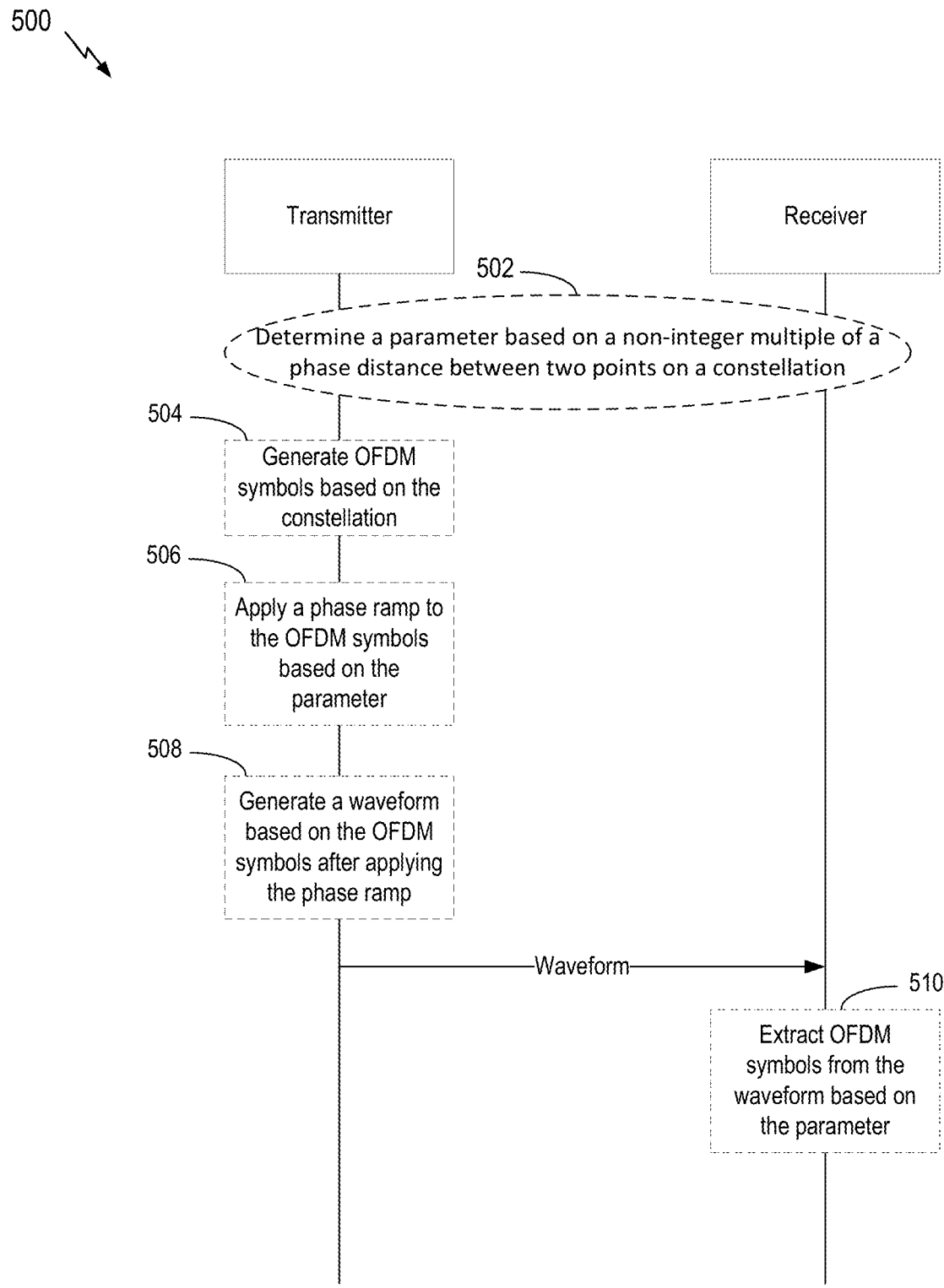
FIG. 5 depicts a call flow diagram, in accordance with certain aspects of the present disclosure.

FIG. 5 depicts a call flow diagram 500 for generating an OFDM waveform with a phase ramp applied to OFDM symbols, in accordance with certain aspects of the present disclosure. In some aspects, the transmitter and/or the receiver shown in FIG. 5 may be an example of the UE 104 depicted and described with respect to FIGS. 1 and 3 or may be an example of the BS 102 (e.g., a gNB) depicted and described with respect to FIGS. 1 and 3 or a disaggregated base station depicted and described with respect to FIG. 2.

As illustrated at 502, the transmitter and/or the receiver may determine a parameter (e.g., θ) based on a non-integer multiple of a phase distance between two points on a constellation (e.g., a minimum phase distance between two points on a constellation).

As illustrated at 504, the transmitter may generate OFDM symbols based on the constellation. As illustrated at 506, the transmitter may apply a phase ramp to the OFDM symbols based on the parameter θ. As illustrated at 508, the transmitter may generate a waveform based on the OFDM symbols after applying the phase ramp. As shown, the waveform may be transmitted from the transmitter to the receiver. As illustrated at 510, the receiver may extract OFDM symbols from the waveform based on the parameter θ.

In some aspects, for PAPR reduction in DFT-S-OFDM, a transmitter may add a phase of k*θ to the k'th DFT-S-OFDM symbol. In some cases, the transmitter may add such a phase to a k+d'th symbol, based on some symbol offset d. For PAPR reduction in CP-OFDM, transmitter may add a phase of $(k^2)*\theta$ to the k'th (or k+d'th) CP-OFDM symbol. A phase bias (configured per UE) may be also added (i.e. rotation for the k'th symbol be $(k^2)*\theta+\theta_{offset}$).

As noted above, the parameter, θ, may be a non-integer (e.g., fraction) multiple of the half of the (e.g., phase) distance of two constellation points. For example, θ may be a non-integer multiple of the half of the minimum phase distance of the constellation (e.g. a fraction and/or non-integer multiple of π/4 for QPSK), and/or irrational multiple of π.

In some aspects, the base constellation may be PSK (e.g. BPSK, QPSK, 8PSK) or Quadrature Amplitude Modulation (QAM) (e.g. 16QAM, 64 QAM, 256 QAM) or other two or more dimensional constellations. The base constellation may be a 4-dimensional constellation over two polarization.

In some aspects, the effect of the phase addition described herein is that the k'th symbol may be rotated by a phase of $k*\theta+\theta_0$, where θ and $\theta_0$ are non-integer multiples of minimum distance of the constellation points or irrational multiples/fractions of π (or approximation of those multiples/fractions). As used herein, "modulation points" and "constellation points of a modulation" may be used interchangeably.

A chirp signal may generally refer to a signal whose frequency continuously changes over time. A chirp stair step size refers to the rate at which the frequency of the chirp signal changes between consecutive samples. For example, a chirp signal may be conceptualized as a staircase-like waveform, where each step corresponds to a change in frequency. The chirp stair step size represents the magnitude of the frequency change from one step to the next. A phase ramp is a signal that exhibits a linear change in phase over time. It is often used to represent the linear frequency modulation (LFM) characteristics of a chirp signal. The phase ramp step size generally refers to the rate at which the phase of the signal changes between consecutive samples, quantifying the angular change in phase from one step to the next.

In some aspects, a phase ramp step size (e.g., a chirp stairs step size), which may be defined by θ, and/or the application of the phase ramp step size, may depend on constellation size, the type of pulse shaping/spectrum extension (e.g., or lack thereof), the number of symbols in the data stream and/or the corresponding time/frequency allocation (e.g. number of resource blocks (RBs)), tone reservation (e.g., or lack thereof), and/or CP length in CP-OFDM scenarios.

In some cases, the phase ramp step size (θ) may be an irrational algebraic multiple of π or an irrational algebraic multiple of the minimum phase distance of the constellation, or an approximation of that. The required accuracy of the approximation may depend on number of symbols in the data stream and/or the corresponding time and/or frequency allocation (e.g. number of RBs). The corresponding irrational algebraic number may be the golden ratio or the square root of two or their "equivalent real numbers."

In some aspects, parameters of the fractional phase-ramped DFT-S-OFDM/CP-OFDM may be explicitly configured by gNB (e.g., via RRC) or be selected from a set of predefined parameters (e.g., specified in wireless communication standards). In some aspects, the set of predefined parameters (e.g., from wireless communication standard specifications) may be obtained via a computer-aided optimization.

In some aspects, parameters of the fractional phase-ramped DFT-S-OFDM/CP-OFDM may depend on dynamic parameters of data scheduling (e.g. the number of symbols in the data stream), the corresponding time/frequency allocation (e.g. number of RBs), and/or modulation and coding scheme (MCS)), according to configuration and/or predefined rules.

In some aspects, fractional phase-ramped DFT-S-OFDM/CP-OFDM may be indicated for UL and/or DL data transmission semi-statically via RRC configuration. In some aspects, fractional phase-ramped DFT-S-OFDM/CP-OFDM may be dynamically activated and/or deactivated for UL and/or DL data transmission and/or its parameters may be changed via dynamic waveform switching. In some aspects, dynamic waveform switching may be via DCI or MAC-CE.

In some cases, the techniques described above may be applicable conditionally, for example, based on UE capability.

As noted above, in some cases, the parameter used to add a phase to OFDM symbols for a given data transmission occasion (or other period/amount of data) may be dynamically indicated. In this context, such a parameter may be considered a data-dependent parameter.

Figure 6:
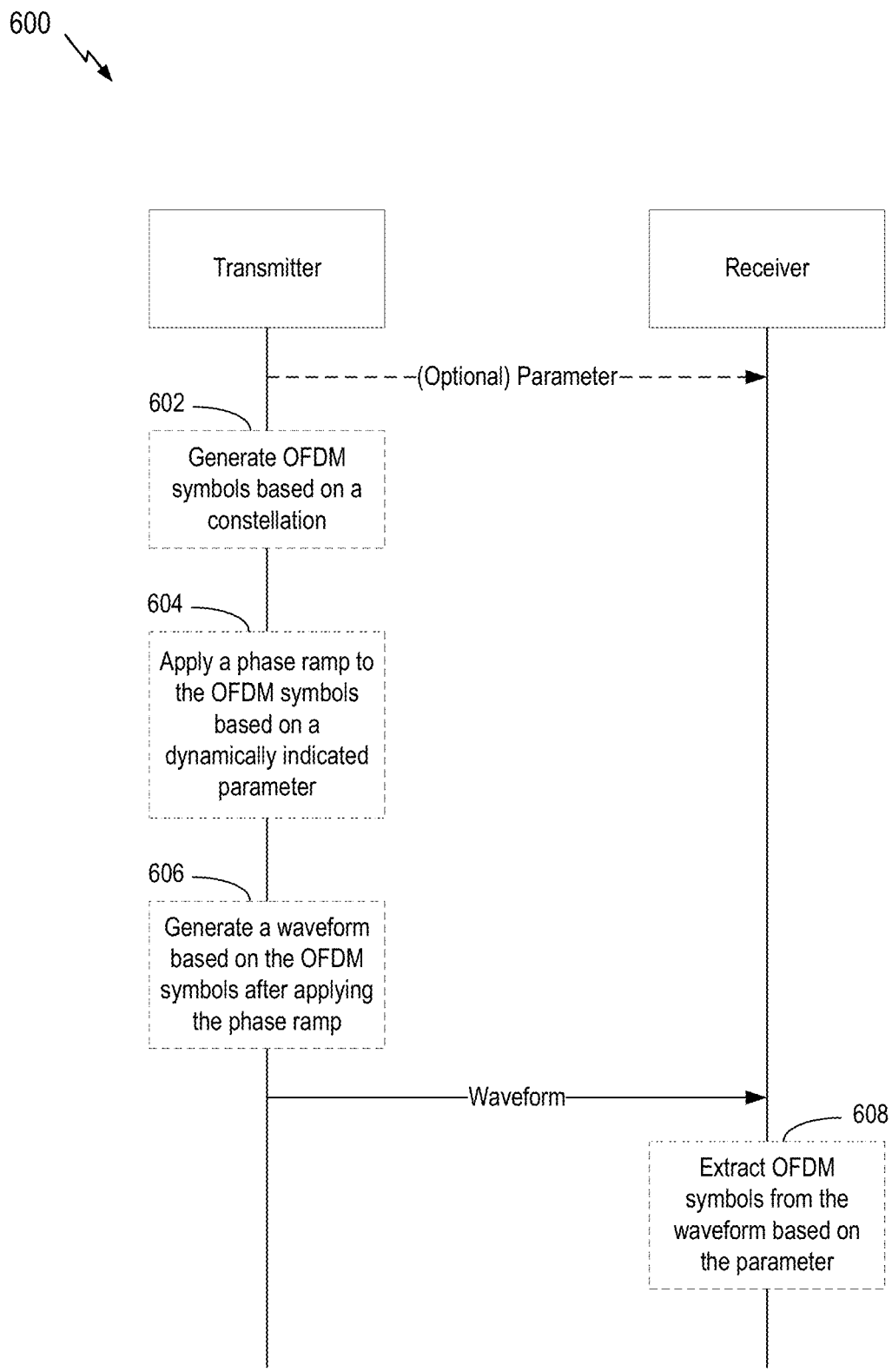
FIG. 6 depicts a call flow diagram, in accordance with certain aspects of the present disclosure.

FIG. 6 depicts a call flow diagram 600 for generating an OFDM waveform with a phase ramp applied to OFDM symbols based on a dynamically indicated parameter, in accordance with certain aspects of the present disclosure. In some aspects, the transmitter and/or the receiver shown in FIG. 6 may be an example of the UE 104 depicted and described with respect to FIGS. 1 and 3 or may be an example of the BS 102 (e.g., a gNB) depicted and described with respect to FIGS. 1 and 3 or a disaggregated base station depicted and described with respect to FIG. 2.

As illustrated at 602, the transmitter may generate OFDM symbols based on a constellation.

As illustrated at 604, the transmitter may apply a phase ramp to the OFDM symbols based on a dynamically indicated parameter (e.g., θ). As illustrated, in some cases, the (value of the) parameter may be dynamically signaled by the transmitter to the receiver. In other cases, the receiver could dynamically signal the parameter to the transmitter. As illustrated at 606, the transmitter may generate a waveform based on the OFDM symbols after applying the phase ramp. As shown, the waveform may be transmitted from the transmitter to the receiver. As illustrated at 608, the receiver may extract OFDM symbols from the waveform based on the dynamically indicated parameter θ.

As noted above, in some cases, these techniques may incorporate dynamic signaling. For example, for PAPR reduction in OFDM-based systems (e.g. DFT-S-OFDM, CP-OFDM), transmitter may add a phase to one or more OFDM symbols. For example, the transmitter may add a phase of k*θ to the k'th DFT-S-OFDM symbol (or (k+d)'th symbol, for some symbol offset d) or may add a phase of $(k^2)*\theta$ to the k'th CP-OFDM symbol (or (k+d)'th symbol), where the parameter $\theta$ may be dynamically indicated (e.g., for one instance/occasion/block of data transmission).

In some aspects, $\theta$ may be dynamically indicated as a fraction and/or non-integer multiple of the half of (e.g., phase) distance of two constellation points and/or $\pi$. For example, $\theta$ may be indicated as a fraction and/or non-integer multiple of the half of the minimum phase distance of the constellation (e.g. a fraction and/or non-integer multiple of $\pi/4$ for QPSK).

In some aspects, $\theta$ may be determined by the transmitter based on the intended streams of data symbols, and may be indicated to the receiver.

In some aspects, for example, the transmitter may be a network entity (e.g., a gNB), and the phase ramp step $\theta$ may be indicated as part of the scheduling DCI. In some aspects, the transmitter may be a UE and the receiver may be a gNB. In such cases, the phase ramp step may be indicated using UCI (where UCI may be transmitted via PUCCH, or as UCI on PUSCH).

In some aspects, the techniques disclosed herein may be applicable to a sidelink scenario (e.g., a UE transmitting data to another UE). In such cases, the phase ramp step may be indicated as part of the scheduling sidelink control information (SCI), transmitted via PSSCH.

In some cases, the resolution/granularity of $\theta$ may depend on UE capability, the modulation order, constellation size, and/or constellation shape. In some aspects, the techniques described above may be applied conditionally, for example, based on UE capability.

As noted above, the techniques disclosed herein may achieve significant PAPR improvements in DFT-S-OFDM and CP-OFDM, without any pulse shaping, spectrum extension, or EVM impact ultimately improving system performance, spectral efficiency, and power efficiency of wireless communications systems.

The techniques presented herein may achieve various degrees of PAPR reduction, for various scenarios (and types of OFDM waveforms).

Figure 7:
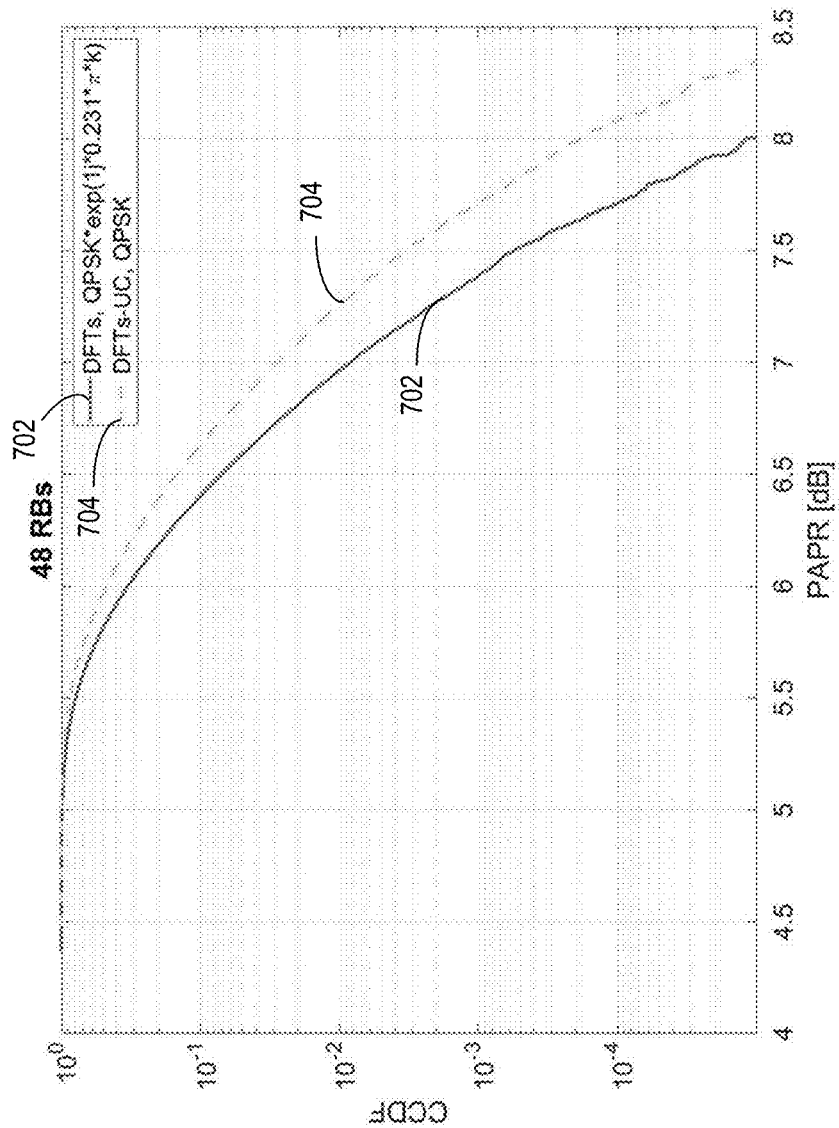
FIGS. 7-12 depict example results of peak to average power ratio (PAPR) reductions achieved using waveform generation techniques in accordance with certain aspects of the present disclosure.

As illustrated with reference to plot 702 of FIG. 7, the techniques disclosed herein may provide significant reductions to PAPR compared to traditional QPSK (plot 704) for DFT-s-OFDM communications. As illustrated, for example, the PAPR improvement associated with the techniques disclosed herein (e.g., QPSK with phase adjusted (phase ramp) OFDM symbols based on a parameter that depends on a non-integer multiple of a phase distance between two points on the constellation) increases as the complementary cumulative distribution function (CCDF) decreases.

Figure 8:
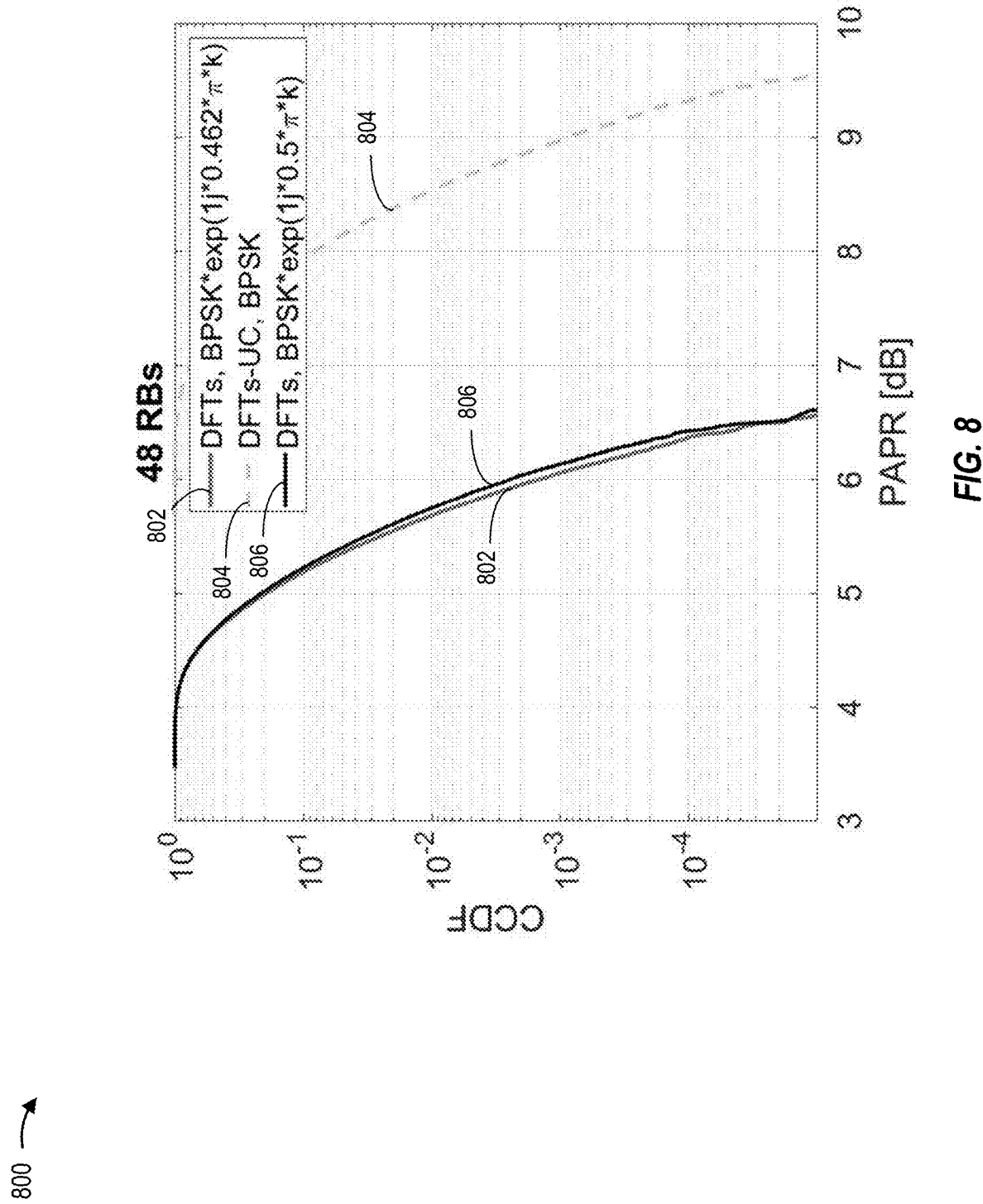

As illustrated with reference to plots 802 and 806 in FIG. 8, the techniques disclosed herein may provide significant reductions to PAPR compared to traditional BPSK 804 for DFT-s-OFDM communications. As illustrated, for example, the PAPR improvement associated with the techniques disclosed herein (e.g., BPSK with phase adjusted OFDM symbols based on a parameter that depends on a non-integer multiple of a phase distance between two points on the constellation) increases as the CCDF decreases.

Figure 9:
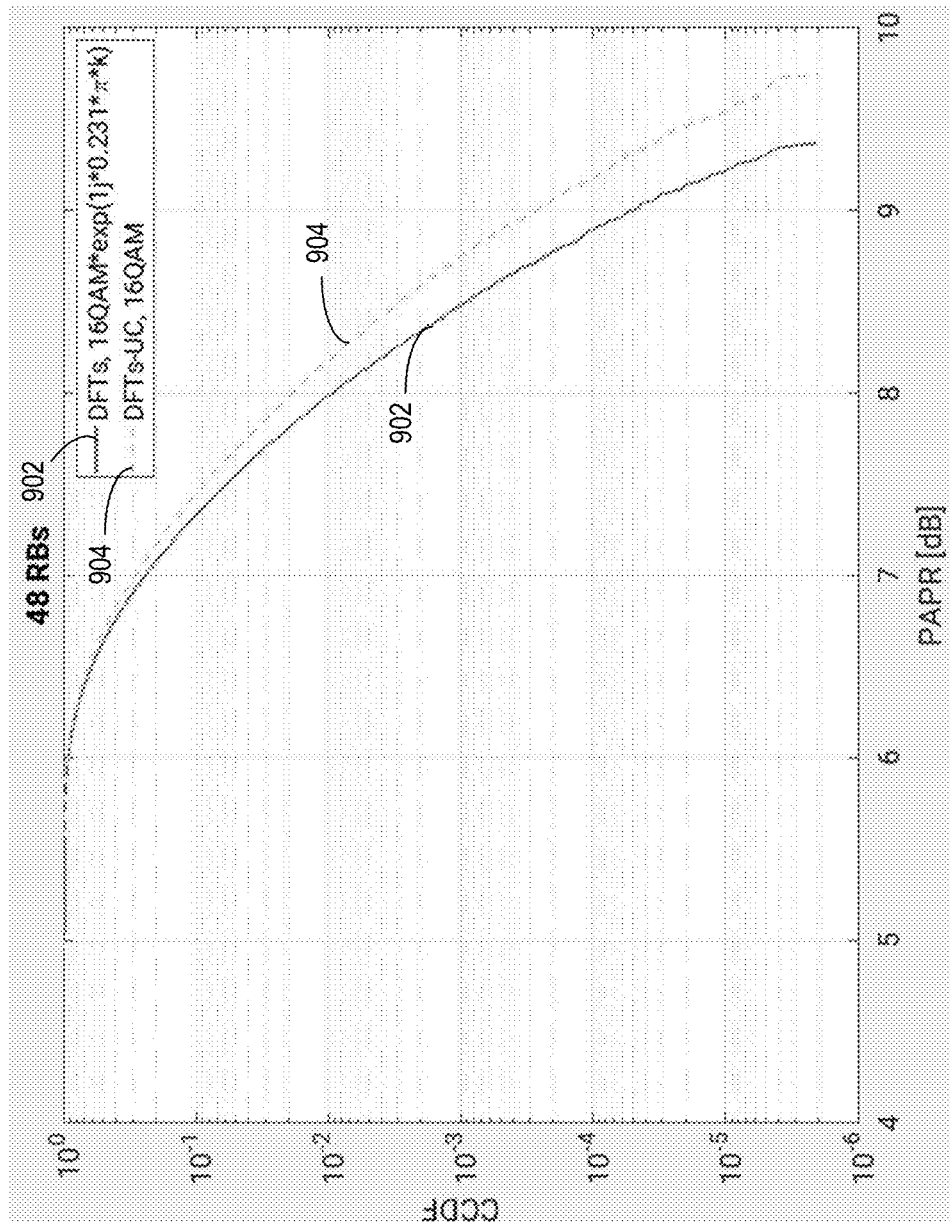

As illustrated with reference to plot 902 in FIG. 9, the techniques disclosed herein may provide significant reductions to PAPR compared to traditional 16QAM (plot 904) for DFT-s-OFDM communications. As illustrated, for example, the PAPR improvement associated with the techniques disclosed herein (e.g., 16QAM with phase adjusted OFDM symbols based on a parameter that depends on a non-integer multiple of a phase distance between two points on the constellation) increases as the CCDF decreases.

Figure 10:
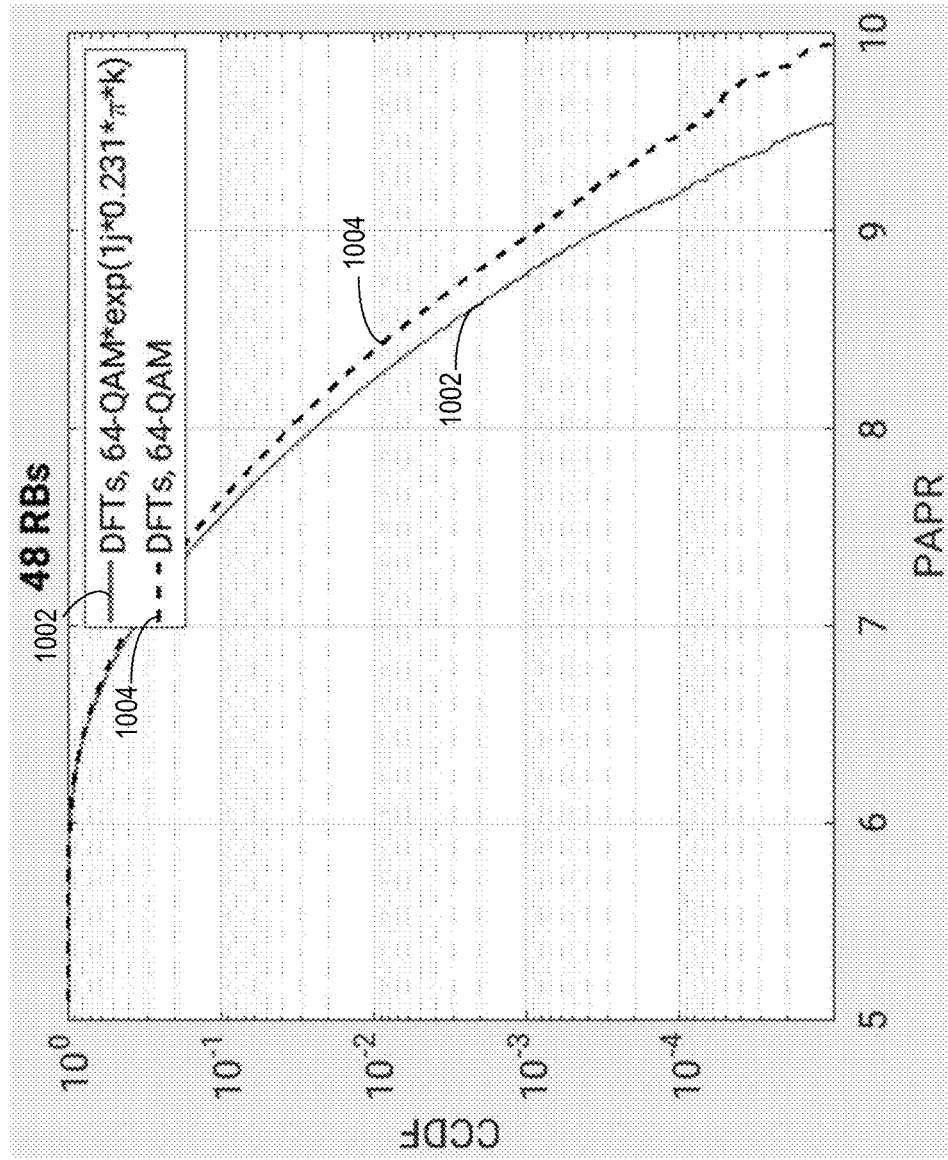

As illustrated with reference to plot 1002 in FIG. 10, the techniques disclosed herein may provide significant reductions to PAPR compared to traditional 64QAM (plot 1004) for DFT-s-OFDM communications. As illustrated, for example, the PAPR improvement associated with the techniques disclosed herein (e.g., 64QAM with phase adjusted OFDM symbols based on a parameter that depends on a non-integer multiple of a phase distance between two points on the constellation) increases as the CCDF decreases.

Figure 11:
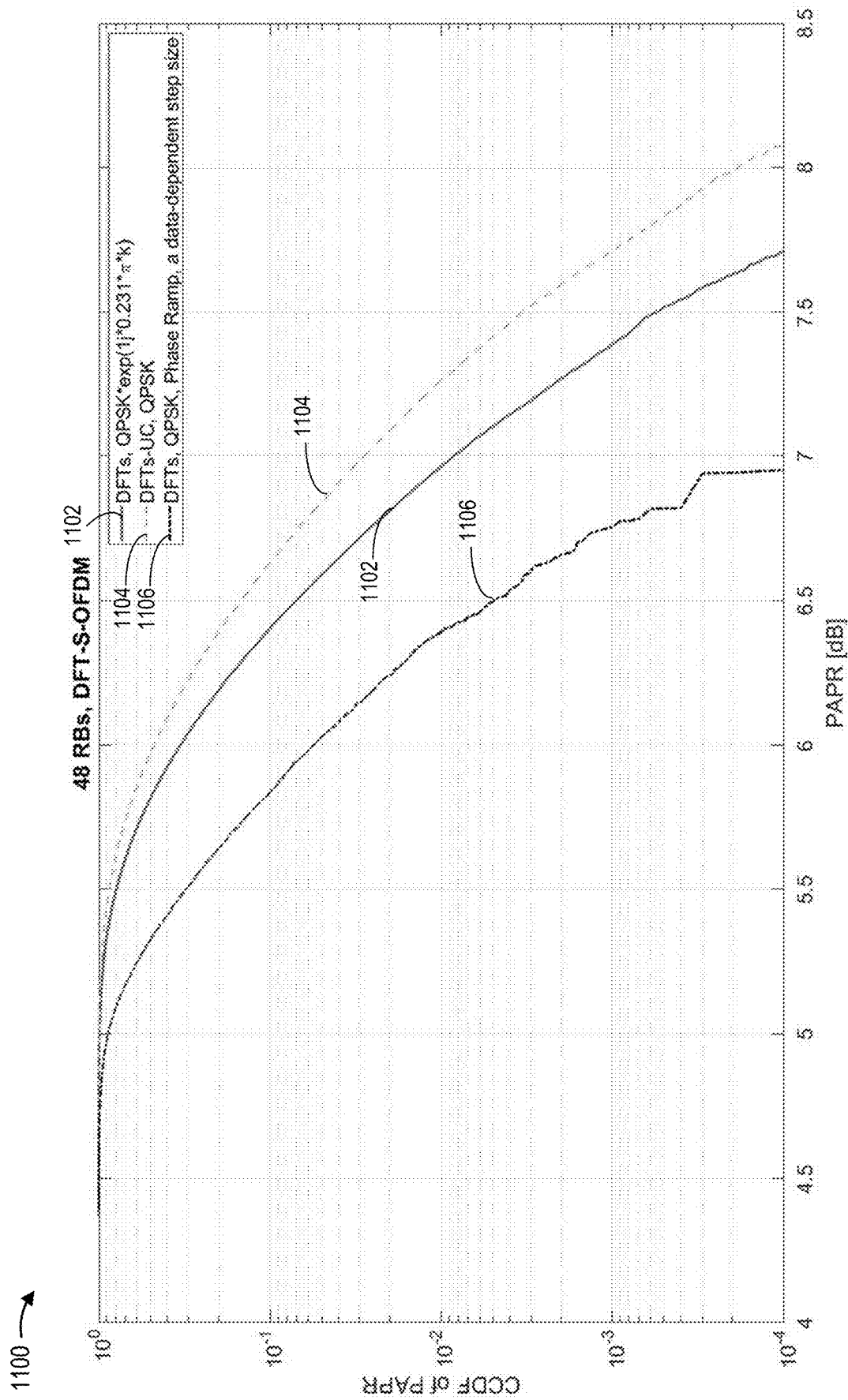

As illustrated with reference to plots 1102 and 1106 in FIG. 11, the techniques disclosed herein may provide significant reductions to PAPR compared to traditional QPSK (plot 1104) for DFT-s-OFDM communications. As illustrated, for example, the PAPR improvement associated with the techniques disclosed herein (e.g., QPSK with phase adjusted OFDM symbols) increases as the CCDF decreases. As illustrated, for example, plot 1102 illustrates a phase adjustment based on a parameter that depends on a non-integer multiple of a phase distance between two points on the constellation, providing significant PAPR improvement over traditional QPSK.

As noted above, however, while this technique provides a significant PAPR reduction, using dynamic signaling may increase the PAPR reduction with little overhead cost. As illustrated for example, 1106 illustrates a phase adjustment (e.g., phase ramp) having a data dependent step size (e.g., dependent on data in dynamic signaling). This technique provides significant additional PAPR reduction, over traditional QPSK and over QPSK with phase adjustment based on a parameter that depends on a non-integer multiple of a phase distance between two points on the constellation.

Figure 12:
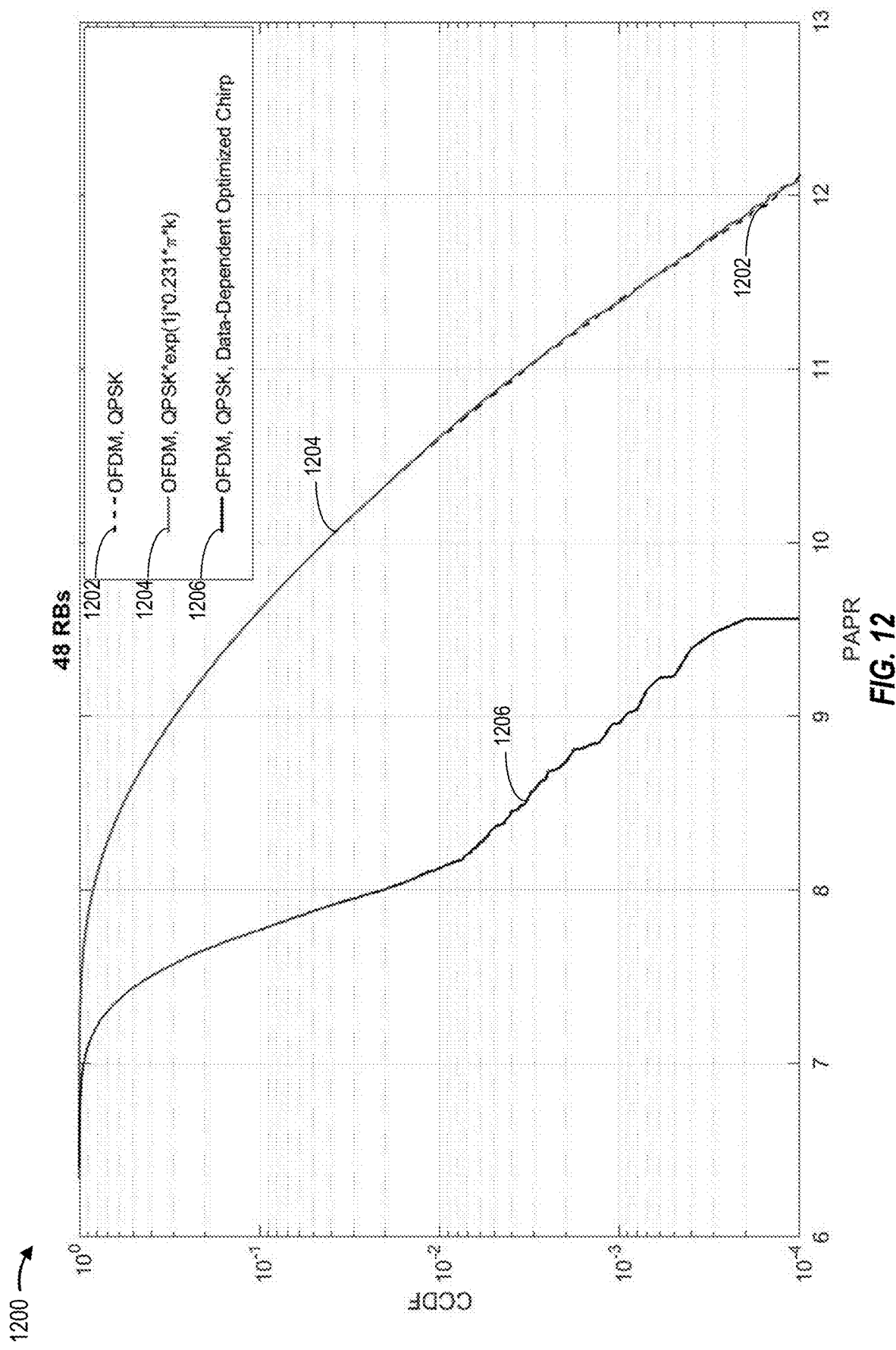

As illustrated with reference to plots 1204 and 1206 in FIG. 12, the techniques disclosed herein may provide significant reductions to PAPR compared to traditional QPSK (plot 1202) for CP-OFDM communications. As illustrated at plot 1204, however, in some cases, a phase adjustment based on a parameter that depends on a non-integer multiple of a phase distance between two points on the constellation may be unable to provide significant PAPR improvement over traditional QPSK for CP-OFDM.

As noted above, however, using dynamic signaling to adjust a phase (e.g., to optimize the chirp) may increase the PAPR reduction with little overhead cost. As illustrated for example, plot 1206 illustrates a phase adjustment (e.g., phase ramp/chirp step optimization) having a data dependent step size (e.g., dependent on data in dynamic signaling). This technique provides significant additional PAPR reduction, over traditional QPSK and over QPSK with phase adjustment based on a parameter that depends on a non-integer multiple of a phase distance between two points on the constellation. As illustrated, for example, the PAPR improvement associated with the data dependent optimized chirp tends to increase as the CCDF decreases.

Example Operations

Figure 13:
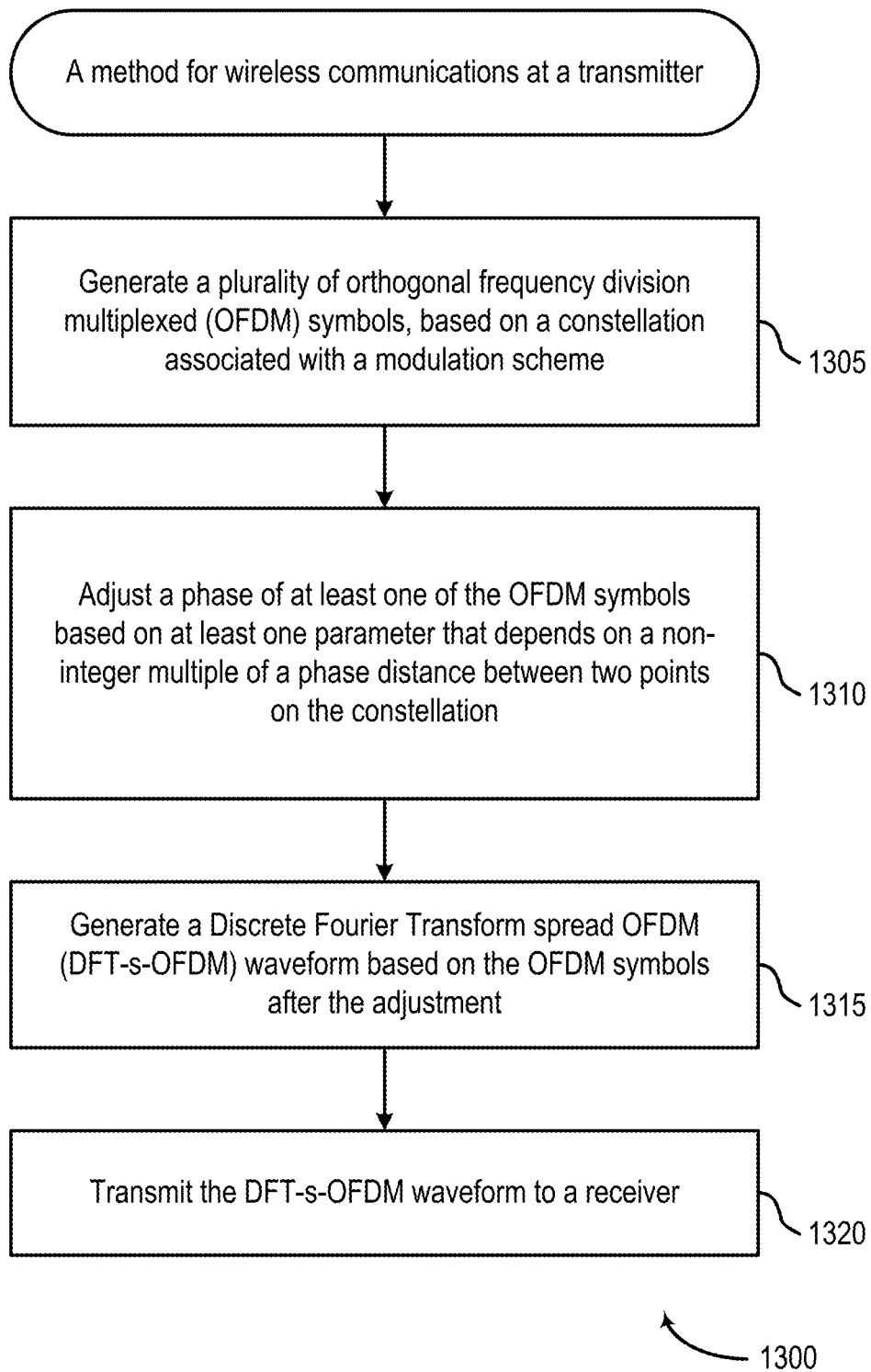
FIG. 13 depicts a method for wireless communications.

FIG. 13 shows an example of a method 1300 of wireless communications at a transmitter. In some examples, the transmitter is a user equipment, such as a UE 104 of FIGS. 1 and 3. In some examples, the transmitter is a network entity, such as a BS 102 of FIGS. 1 and 3, or a disaggregated base station as discussed with respect to FIG. 2.

Method 1300 begins at step 1305 with generating a plurality of orthogonal frequency division multiplexed (OFDM) symbols, based on a constellation associated with a modulation scheme. In some cases, the operations of this step refer to, or may be performed by, circuitry for generating and/or code for generating as described with reference to FIG. 21.

Method 1300 then proceeds to step 1310 with adjusting a phase of at least one of the OFDM symbols based on at least one parameter that depends on a non-integer multiple of a phase distance between two points on the constellation. In some cases, the operations of this step refer to, or may be performed by, circuitry for adjusting and/or code for adjusting as described with reference to FIG. 21.

Method 1300 then proceeds to step 1315 with generating a Discrete Fourier Transform spread OFDM (DFT-s-OFDM) waveform based on the OFDM symbols after the adjustment. In some cases, the operations of this step refer to, or may be performed by, circuitry for generating and/or code for generating as described with reference to FIG. 21.

Method 1300 then proceeds to step 1320 with transmitting the DFT-s-OFDM waveform to a receiver. In some cases, the operations of this step refer to, or may be performed by, circuitry for transmitting and/or code for transmitting as described with reference to FIG. 21.

In some aspects, the parameter depends on a non-integer multiple of a half of a minimum phase distance between the two points on the constellation.

In some aspects, the OFDM symbols are mapped to N subcarriers; and the phase adjustment for an OFDM symbol mapped to a kth subcarrier out of the N subcarriers is also based on k.

In some aspects, the phase adjustment for the OFDM symbol mapped to the kth subcarrier is also based on a symbol offset d.

In some aspects, the phase adjustment is also based on a phase offset.

In some aspects, the constellation comprises a four-dimensional constellation.

In some aspects, a value of the parameter is based on a size of the constellation.

In some aspects, at least one of a value of the parameter or whether the phase is adjusted based on the parameter depends on at least one of: a type of pulse shaping or spectrum extension applied at the transmitter.

In some aspects, a value of the parameter is based on at least one of: a number of symbols in a data stream from which the OFDM symbols are generated; or time and frequency resources allocated for the data stream.

In some aspects, the at least one parameter is at least one of: determined based on radio resource control (RRC) signaling, selected from a set of predefined parameters, dependent on dynamic parameters of data scheduling, based on a configuration, or based on one or more rules.

In some aspects, at least one of: the adjustment is dynamically activated or deactivated for at least one of uplink data transmission, downlink data transmission, or sidelink data transmission via dynamic waveform switching; or the at least one parameter is changed via dynamic waveform switching.

In some aspects, at least one of a value of the parameter or whether the phase is adjusted based on the parameter depends on a capability of at least one of the transmitter or the receiver.

In some aspects, at least one of a value of the parameter is dynamically indicated for a transmission occasion.

Figure 21:
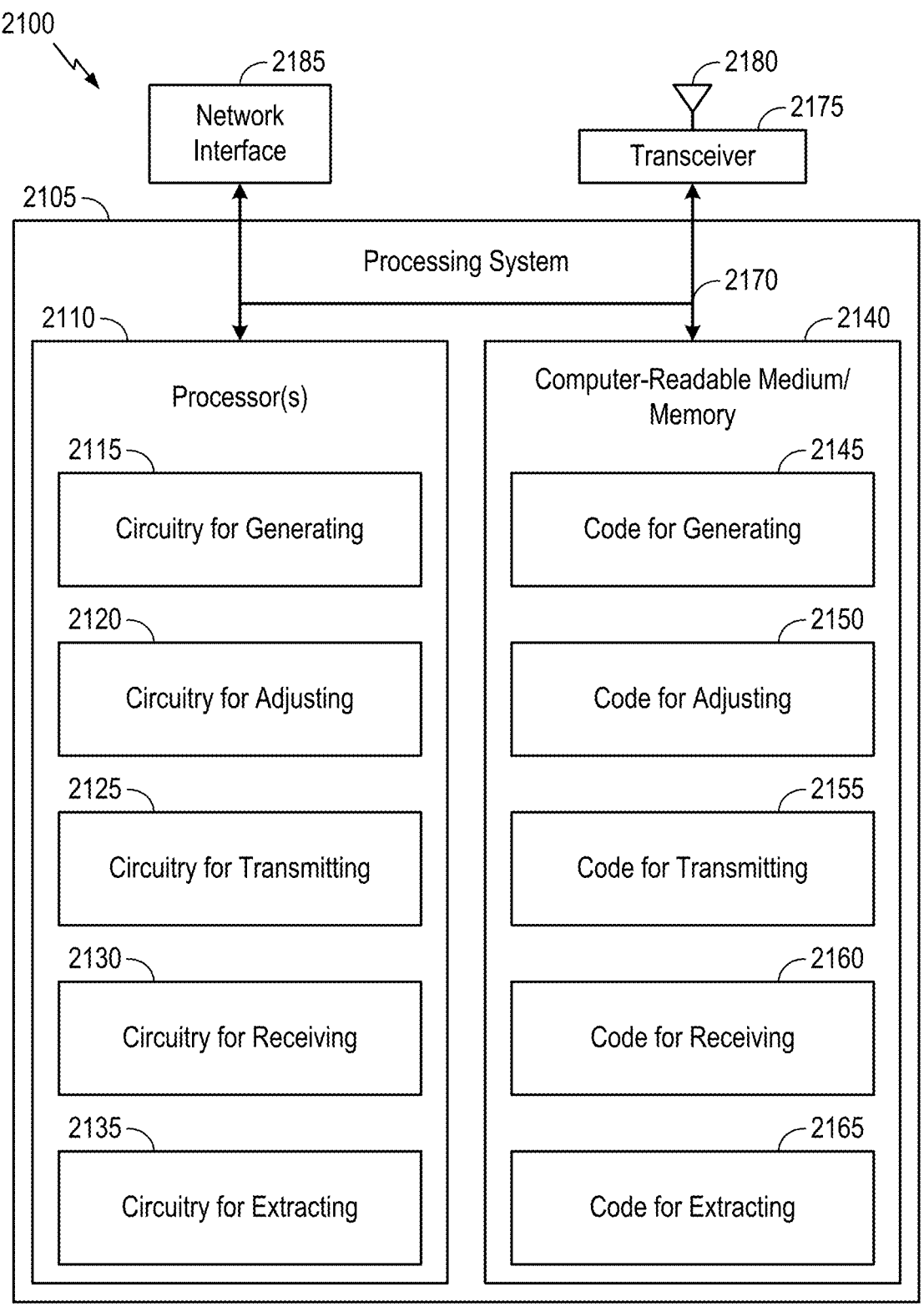
FIG. 21 depicts aspects of an example communications device.

In one aspect, method 1300, or any aspect related to it, may be performed by an apparatus, such as communications device 2100 of FIG. 21, which includes various components operable, configured, or adapted to perform the method 1300. Communications device 2100 is described below in further detail.

Note that FIG. 13 is just one example of a method, and other methods including fewer, additional, or alternative steps are possible consistent with this disclosure.

Figure 14:
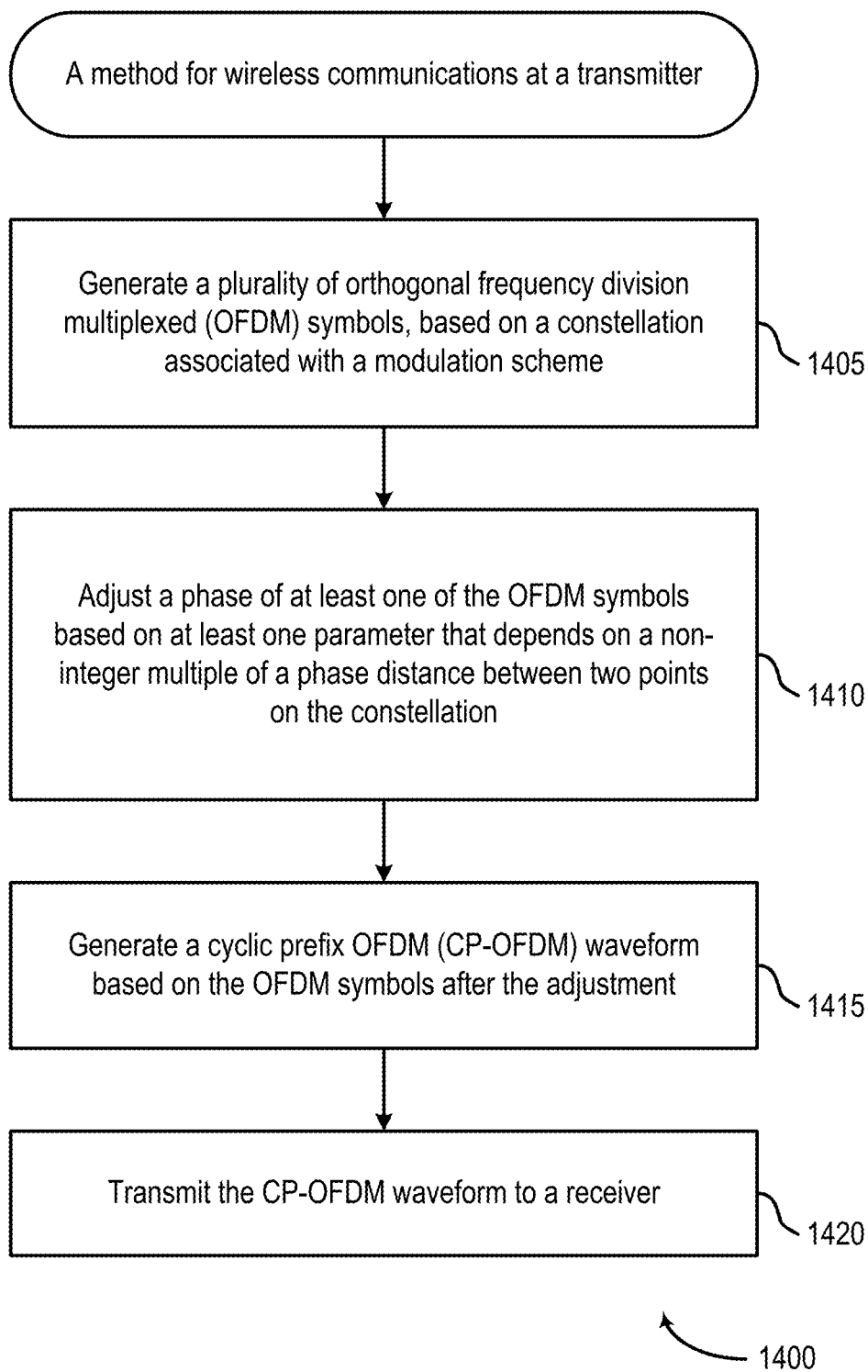
FIG. 14 depicts a method for wireless communications.

FIG. 14 shows an example of a method 1400 of wireless communications at a transmitter. In some examples, the transmitter is a user equipment, such as a UE 104 of FIGS. 1 and 3. In some examples, the transmitter is a network entity, such as a BS 102 of FIGS. 1 and 3, or a disaggregated base station as discussed with respect to FIG. 2.

Method 1400 begins at step 1405 with generating a plurality of orthogonal frequency division multiplexed (OFDM) symbols, based on a constellation associated with a modulation scheme. In some cases, the operations of this step refer to, or may be performed by, circuitry for generating and/or code for generating as described with reference to FIG. 21.

Method 1400 then proceeds to step 1410 with adjusting a phase of at least one of the OFDM symbols based on at least one parameter that depends on a non-integer multiple of a phase distance between two points on the constellation. In some cases, the operations of this step refer to, or may be performed by, circuitry for adjusting and/or code for adjusting as described with reference to FIG. 21.

Method 1400 then proceeds to step 1415 with generating a cyclic prefix OFDM (CP-OFDM) waveform based on the OFDM symbols after the adjustment. In some cases, the operations of this step refer to, or may be performed by, circuitry for generating and/or code for generating as described with reference to FIG. 21.

Method 1400 then proceeds to step 1420 with transmitting the CP-OFDM waveform to a receiver. In some cases, the operations of this step refer to, or may be performed by, circuitry for transmitting and/or code for transmitting as described with reference to FIG. 21.

In some aspects, the parameter depends on a non-integer multiple of a half of a minimum phase distance between the two points on the constellation.

In some aspects, the OFDM symbols are mapped to N subcarriers; and the phase adjustment for an OFDM symbol mapped to a kth subcarrier out of the N subcarriers is also based on k to a power of 2 or greater.

In some aspects, the phase adjustment for the OFDM symbol mapped to the kth subcarrier is also based on a symbol offset d.

In some aspects, the phase adjustment is also based on a phase offset.

In some aspects, the constellation comprises a four-dimensional constellation.

In some aspects, a value of the parameter is based on a size of the constellation.

In some aspects, at least one of a value of the parameter or whether the phase is adjusted based on the parameter depends on at least one of: a type of pulse shaping or spectrum extension applied at the transmitter.

In some aspects, a value of the parameter is based on at least one of: a number of symbols in a data stream from which the OFDM symbols are generated; or time and frequency resources allocated for the data stream.

In some aspects, the at least one parameter is at least one of: determined based on radio resource control (RRC) signaling, selected from a set of predefined parameters, dependent on dynamic parameters of data scheduling, based on a configuration, or based on one or more rules.

In some aspects, at least one of: the adjustment is dynamically activated or deactivated for at least one of uplink data transmission, downlink data transmission, or sidelink data transmission via dynamic waveform switching; or the at least one parameter is changed via dynamic waveform switching.

In some aspects, at least one of a value of the parameter or whether the phase is adjusted based on the parameter depends on a capability of at least one of the transmitter or the receiver.

In some aspects, at least one of a value of the parameter is dynamically indicated for a transmission occasion.

In one aspect, method 1400, or any aspect related to it, may be performed by an apparatus, such as communications device 2100 of FIG. 21, which includes various components operable, configured, or adapted to perform the method 1400. Communications device 2100 is described below in further detail.

Note that FIG. 14 is just one example of a method, and other methods including fewer, additional, or alternative steps are possible consistent with this disclosure.

Figure 15:
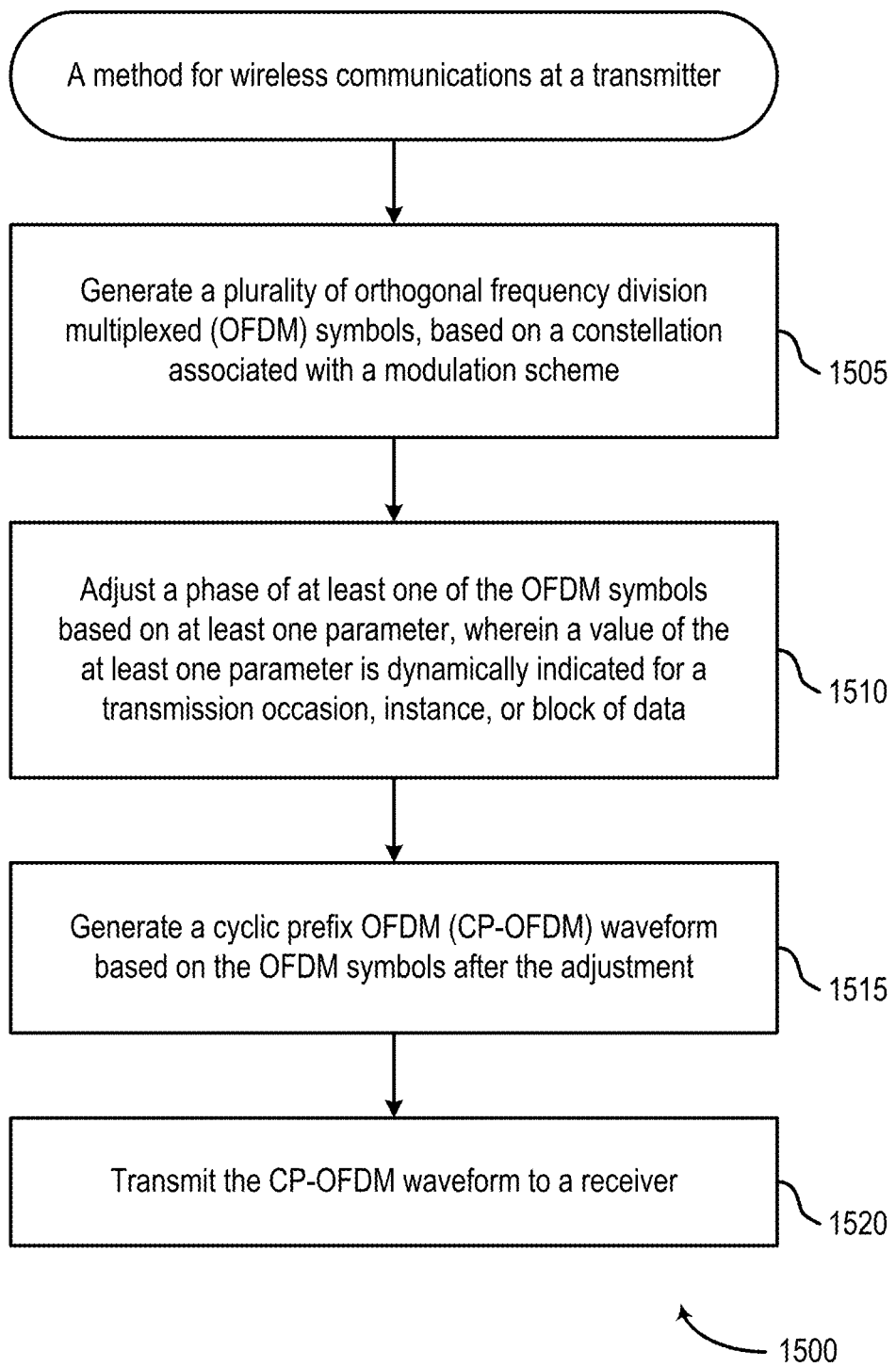
FIG. 15 depicts a method for wireless communications.

FIG. 15 shows an example of a method 1500 of wireless communications at a transmitter. In some examples, the transmitter is a user equipment, such as a UE 104 of FIGS. 1 and 3. In some examples, the transmitter is a network entity, such as a BS 102 of FIGS. 1 and 3, or a disaggregated base station as discussed with respect to FIG. 2.

Method 1500 begins at step 1505 with generating a plurality of orthogonal frequency division multiplexed (OFDM) symbols, based on a constellation associated with a modulation scheme. In some cases, the operations of this step refer to, or may be performed by, circuitry for generating and/or code for generating as described with reference to FIG. 21.

Method 1500 then proceeds to step 1510 with adjusting a phase of at least one of the OFDM symbols based on at least one parameter, wherein a value of the at least one parameter is dynamically indicated for a transmission occasion, instance, or block of data. In some cases, the operations of this step refer to, or may be performed by, circuitry for adjusting and/or code for adjusting as described with reference to FIG. 21.

Method 1500 then proceeds to step 1515 with generating a cyclic prefix OFDM (CP-OFDM) waveform based on the OFDM symbols after the adjustment. In some cases, the operations of this step refer to, or may be performed by, circuitry for generating and/or code for generating as described with reference to FIG. 21.

Method 1500 then proceeds to step 1520 with transmitting the CP-OFDM waveform to a receiver. In some cases, the operations of this step refer to, or may be performed by, circuitry for transmitting and/or code for transmitting as described with reference to FIG. 21.

In some aspects, the transmitter comprises a network entity; and a value of the at least one parameter is dynamically indicated via downlink control information (DCI).

In some aspects, the transmitter comprises a user equipment (UE); and a value of the at least one parameter is dynamically indicated via uplink control information (UCI).

In some aspects, the transmitter comprises a user equipment (UE) and the receiver comprises a UE; and a value of the at least one parameter is dynamically indicated via sidelink control information (SCI).

In some aspects, at least one of a resolution or granularity of the parameter depends on at least one of a modulation order, a size of the constellation, or a shape of the constellation.

In some aspects, at least one of a value of the parameter, a resolution or granularity of the parameter, or whether the phase is adjusted based on the parameter depends on a capability of at least one of the transmitter or the receiver.

In one aspect, method 1500, or any aspect related to it, may be performed by an apparatus, such as communications device 2100 of FIG. 21, which includes various components operable, configured, or adapted to perform the method 1500. Communications device 2100 is described below in further detail.

Note that FIG. 15 is just one example of a method, and other methods including fewer, additional, or alternative steps are possible consistent with this disclosure.

Figure 16:
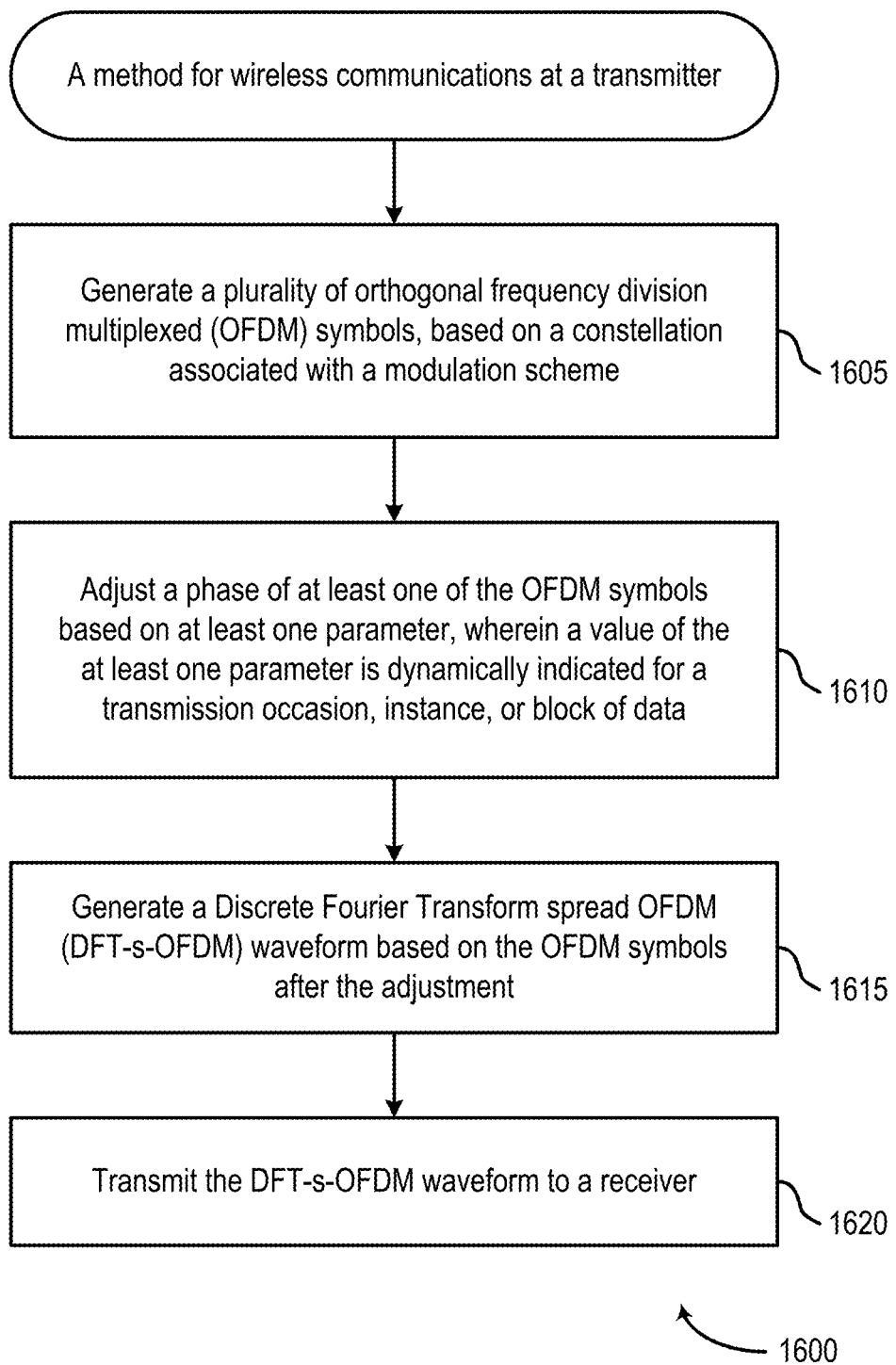
FIG. 16 depicts a method for wireless communications.

FIG. 16 shows an example of a method 1600 of wireless communications at a transmitter. In some examples, the transmitter is a user equipment, such as a UE 104 of FIGS. 1 and 3. In some examples, the transmitter is a network entity, such as a BS 102 of FIGS. 1 and 3, or a disaggregated base station as discussed with respect to FIG. 2.

Method 1600 begins at step 1605 with generating a plurality of orthogonal frequency division multiplexed (OFDM) symbols, based on a constellation associated with a modulation scheme. In some cases, the operations of this step refer to, or may be performed by, circuitry for generating and/or code for generating as described with reference to FIG. 21.

Method 1600 then proceeds to step 1610 with adjusting a phase of at least one of the OFDM symbols based on at least one parameter, wherein a value of the at least one parameter is dynamically indicated for a transmission occasion, instance, or block of data. In some cases, the operations of this step refer to, or may be performed by, circuitry for adjusting and/or code for adjusting as described with reference to FIG. 21.

Method 1600 then proceeds to step 1615 with generating a Discrete Fourier Transform spread OFDM (DFT-s-OFDM) waveform based on the OFDM symbols after the adjustment. In some cases, the operations of this step refer to, or may be performed by, circuitry for generating and/or code for generating as described with reference to FIG. 21.

Method 1600 then proceeds to step 1620 with transmitting the DFT-s-OFDM waveform to a receiver. In some cases, the operations of this step refer to, or may be performed by, circuitry for transmitting and/or code for transmitting as described with reference to FIG. 21.

In some aspects, the transmitter comprises a network entity; and a value of the at least one parameter is dynamically indicated via downlink control information (DCI).

In some aspects, the transmitter comprises a user equipment (UE); and a value of the at least one parameter is dynamically indicated via uplink control information (UCI).

In some aspects, the transmitter comprises a user equipment (UE) and the receiver comprises a UE; and a value of the at least one parameter is dynamically indicated via sidelink control information (SCI).

In some aspects, at least one of a resolution or granularity of the parameter depends on at least one of a modulation order, a size of the constellation, or a shape of the constellation.

In some aspects, at least one of a value of the parameter, a resolution or granularity of the parameter, or whether the phase is adjusted based on the parameter depends on a capability of at least one of the transmitter or the receiver.

In one aspect, method 1600, or any aspect related to it, may be performed by an apparatus, such as communications device 2100 of FIG. 21, which includes various components operable, configured, or adapted to perform the method 1600. Communications device 2100 is described below in further detail.

Note that FIG. 16 is just one example of a method, and other methods including fewer, additional, or alternative steps are possible consistent with this disclosure.

Figure 17:
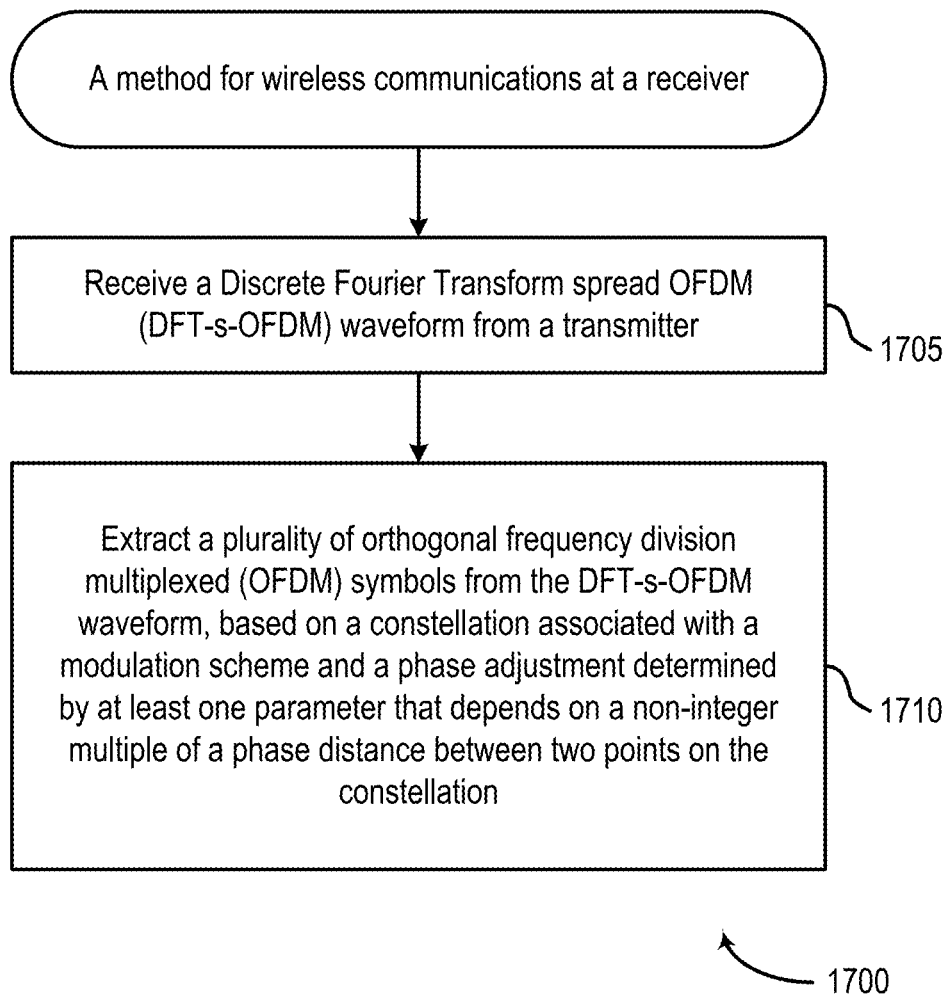
FIG. 17 depicts a method for wireless communications.

FIG. 17 shows an example of a method 1700 of wireless communications at a receiver. In some examples, the receiver is a user equipment, such as a UE 104 of FIGS. 1 and 3. In some examples, the receiver is a network entity, such as a BS 102 of FIGS. 1 and 3, or a disaggregated base station as discussed with respect to FIG. 2.

Method 1700 begins at step 1705 with receiving a Discrete Fourier Transform spread OFDM (DFT-s-OFDM) waveform from a transmitter. In some cases, the operations of this step refer to, or may be performed by, circuitry for receiving and/or code for receiving as described with reference to FIG. 21.

Method 1700 then proceeds to step 1710 with extracting a plurality of orthogonal frequency division multiplexed (OFDM) symbols from the DFT-s-OFDM waveform, based on a constellation associated with a modulation scheme and a phase adjustment determined by at least one parameter that depends on a non-integer multiple of a phase distance between two points on the constellation. In some cases, the operations of this step refer to, or may be performed by, circuitry for extracting and/or code for extracting as described with reference to FIG. 21.

In some aspects, the parameter depends on a non-integer multiple of a half of a minimum phase distance between the two points on the constellation.

In some aspects, the OFDM symbols are demapped from N subcarriers; and the phase adjustment for an OFDM symbol mapped to a kth subcarrier out of the N subcarriers is also based on k.

In some aspects, the phase adjustment for the OFDM symbol mapped to the kth subcarrier is also based on a symbol offset d.

In some aspects, the phase adjustment is also based on a phase offset.

In some aspects, the constellation comprises a four-dimensional constellation.

In some aspects, a value of the parameter is based on a size of the constellation.

In some aspects, at least one of a value of the parameter or whether the phase is adjusted based on the parameter depends on at least one of: a type of pulse shaping or spectrum extension applied at the transmitter.

In some aspects, a value of the parameter is based on at least one of: a number of symbols in a data stream from which the OFDM symbols are generated; or time and frequency resources allocated for the data stream.

In some aspects, the at least one parameter is at least one of: determined based on radio resource control (RRC) signaling, selected from a set of predefined parameters, dependent on dynamic parameters of data scheduling, based on a configuration, or based on one or more rules.

In some aspects, at least one of: the adjustment is dynamically activated or deactivated for at least one of uplink data transmission, downlink data transmission, or sidelink data transmission via dynamic waveform switching; or the at least one parameter is changed via dynamic waveform switching.

In some aspects, at least one of a value of the parameter or whether the phase is adjusted based on the parameter depends on a capability of at least one of the transmitter or the receiver.

In some aspects, at least one of a value of the parameter is dynamically indicated for a transmission occasion.

In one aspect, method 1700, or any aspect related to it, may be performed by an apparatus, such as communications device 2100 of FIG. 21, which includes various components operable, configured, or adapted to perform the method 1700. Communications device 2100 is described below in further detail.

Note that FIG. 17 is just one example of a method, and other methods including fewer, additional, or alternative steps are possible consistent with this disclosure.

Figure 18:
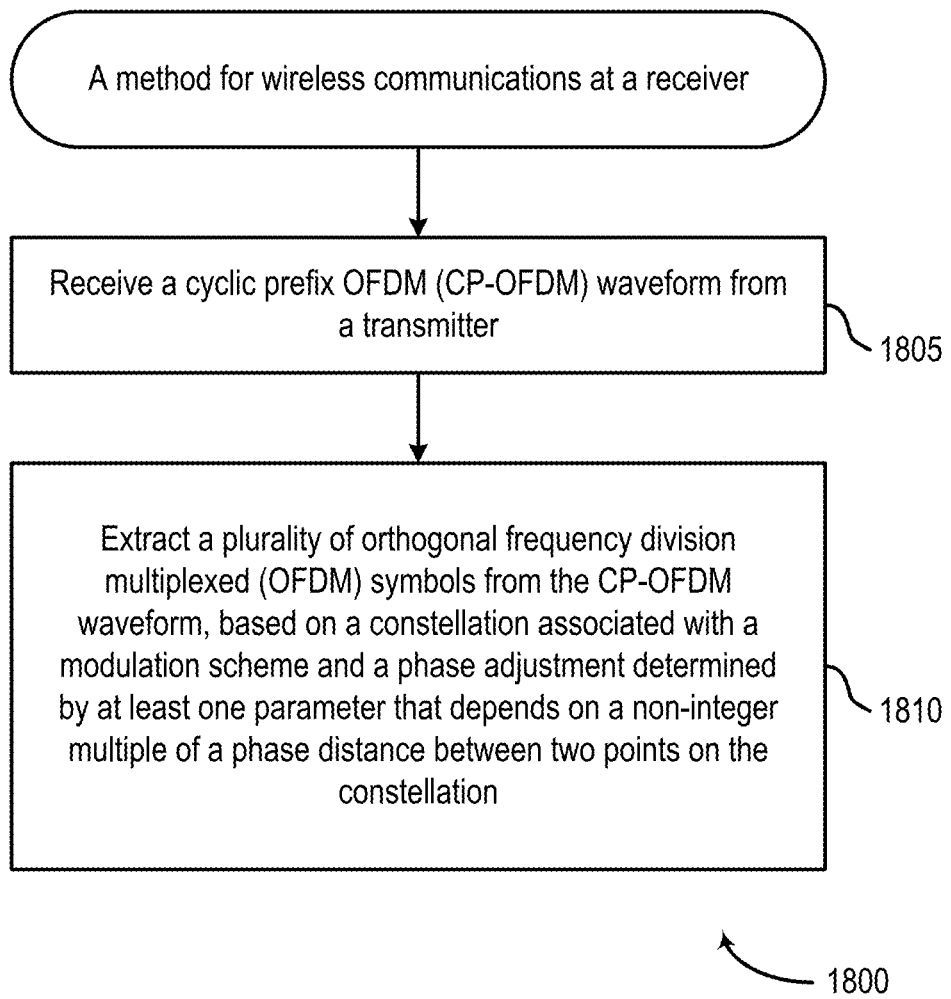
FIG. 18 depicts a method for wireless communications.

FIG. 18 shows an example of a method 1800 of wireless communications at a receiver. In some examples, the receiver is a user equipment, such as a UE 104 of FIGS. 1 and 3. In some examples, the receiver is a network entity, such as a BS 102 of FIGS. 1 and 3, or a disaggregated base station as discussed with respect to FIG. 2.

Method 1800 begins at step 1805 with receiving a cyclic prefix OFDM (CP-OFDM) waveform from a transmitter. In some cases, the operations of this step refer to, or may be performed by, circuitry for receiving and/or code for receiving as described with reference to FIG. 21.

Method 1800 then proceeds to step 1810 with extracting a plurality of orthogonal frequency division multiplexed (OFDM) symbols from the CP-OFDM waveform, based on a constellation associated with a modulation scheme and a phase adjustment determined by at least one parameter that depends on a non-integer multiple of a phase distance between two points on the constellation. In some cases, the operations of this step refer to, or may be performed by, circuitry for extracting and/or code for extracting as described with reference to FIG. 21.

In some aspects, the parameter depends on a non-integer multiple of a half of a minimum phase distance between the two points on the constellation.

In some aspects, the OFDM symbols are demapped from N subcarriers; and the phase adjustment for an OFDM symbol mapped to a kth subcarrier out of the N subcarriers is also based on k to a power of 2 or greater.

In some aspects, the phase adjustment for the OFDM symbol mapped to the kth subcarrier is also based on a symbol offset d.

In some aspects, the phase adjustment is also based on a phase offset.

In some aspects, the constellation comprises a four-dimensional constellation.

In some aspects, a value of the parameter is based on a size of the constellation.

In some aspects, at least one of a value of the parameter or whether the phase is adjusted based on the parameter depends on at least one of: a type of pulse shaping or spectrum extension applied at the transmitter.

In some aspects, a value of the parameter is based on at least one of: a number of symbols in a data stream from which the OFDM symbols are generated; or time and frequency resources allocated for the data stream.

In some aspects, the at least one parameter is at least one of: determined based on radio resource control (RRC) signaling, selected from a set of predefined parameters, dependent on dynamic parameters of data scheduling, based on a configuration, or based on one or more rules.

In some aspects, at least one of: the adjustment is dynamically activated or deactivated for at least one of uplink data transmission, downlink data transmission, or sidelink data transmission via dynamic waveform switching; or the at least one parameter is changed via dynamic waveform switching.

In some aspects, at least one of a value of the parameter or whether the phase is adjusted based on the parameter depends on a capability of at least one of the transmitter or the receiver.

In some aspects, at least one of a value of the parameter is dynamically indicated for a transmission occasion.

In one aspect, method 1800, or any aspect related to it, may be performed by an apparatus, such as communications device 2100 of FIG. 21, which includes various components operable, configured, or adapted to perform the method 1800. Communications device 2100 is described below in further detail.

Note that FIG. 18 is just one example of a method, and other methods including fewer, additional, or alternative steps are possible consistent with this disclosure.

Figure 19:
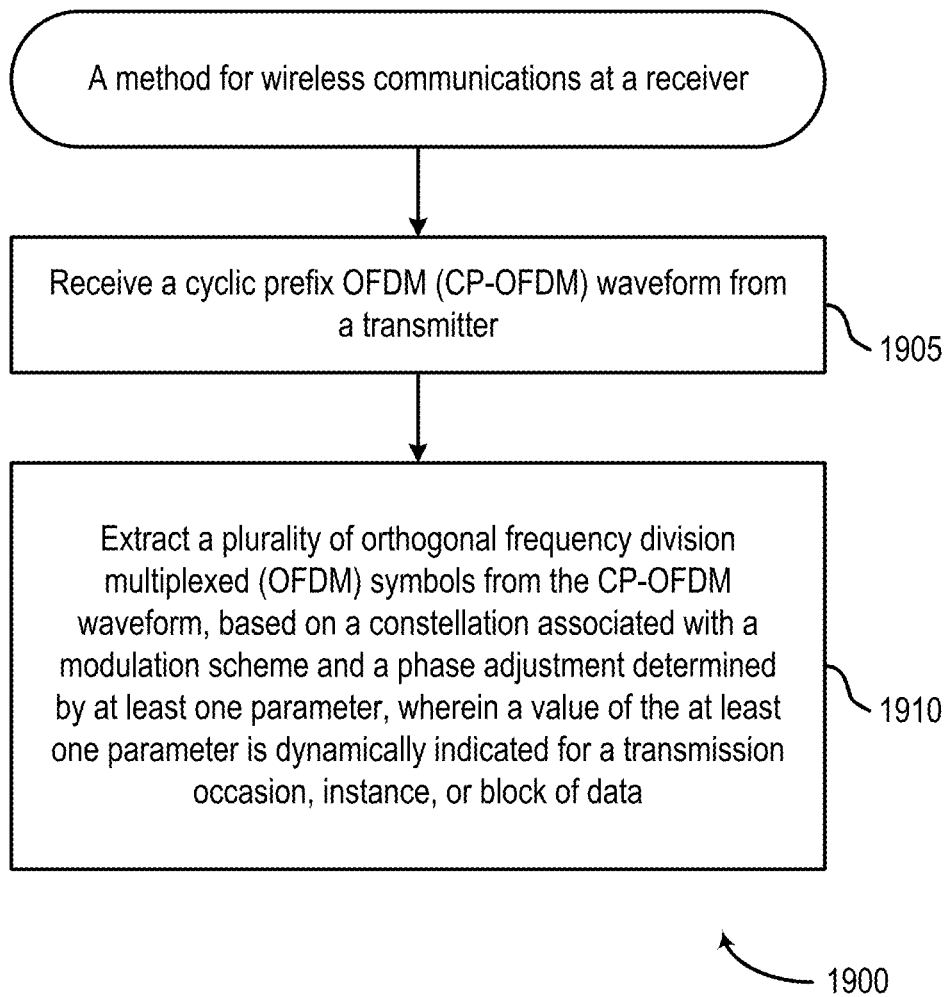
FIG. 19 depicts a method for wireless communications.

FIG. 19 shows an example of a method 1900 of wireless communications at a receiver. In some examples, the receiver is a user equipment, such as a UE 104 of FIGS. 1 and 3. In some examples, the receiver is a network entity, such as a BS 102 of FIGS. 1 and 3, or a disaggregated base station as discussed with respect to FIG. 2.

Method 1900 begins at step 1905 with receiving a cyclic prefix OFDM (CP-OFDM) waveform from a transmitter. In some cases, the operations of this step refer to, or may be performed by, circuitry for receiving and/or code for receiving as described with reference to FIG. 21.

Method 1900 then proceeds to step 1910 with extracting a plurality of orthogonal frequency division multiplexed (OFDM) symbols from the CP-OFDM waveform, based on a constellation associated with a modulation scheme and a phase adjustment determined by at least one parameter, wherein a value of the at least one parameter is dynamically indicated for a transmission occasion, instance, or block of data. In some cases, the operations of this step refer to, or may be performed by, circuitry for extracting and/or code for extracting as described with reference to FIG. 21.

In some aspects, the receiver comprises a user equipment (UE); and a value of the at least one parameter is dynamically indicated via downlink control information (DCI).

In some aspects, the receiver comprises a network entity; and a value of the at least one parameter is dynamically indicated via uplink control information (UCI).

In some aspects, the transmitter comprises a user equipment (UE) and the receiver comprises a UE; and a value of the at least one parameter is dynamically indicated via sidelink control information (SCI).

In some aspects, at least one of a resolution or granularity of the parameter depends on at least one of a modulation order, a size of the constellation, or a shape of the constellation.

In some aspects, at least one of a value of the parameter, a resolution or granularity of the parameter, or whether the phase is adjusted based on the parameter depends on a capability of at least one of the transmitter or the receiver.

In one aspect, method 1900, or any aspect related to it, may be performed by an apparatus, such as communications device 2100 of FIG. 21, which includes various components operable, configured, or adapted to perform the method 1900. Communications device 2100 is described below in further detail.

Note that FIG. 19 is just one example of a method, and other methods including fewer, additional, or alternative steps are possible consistent with this disclosure.

Figure 20:
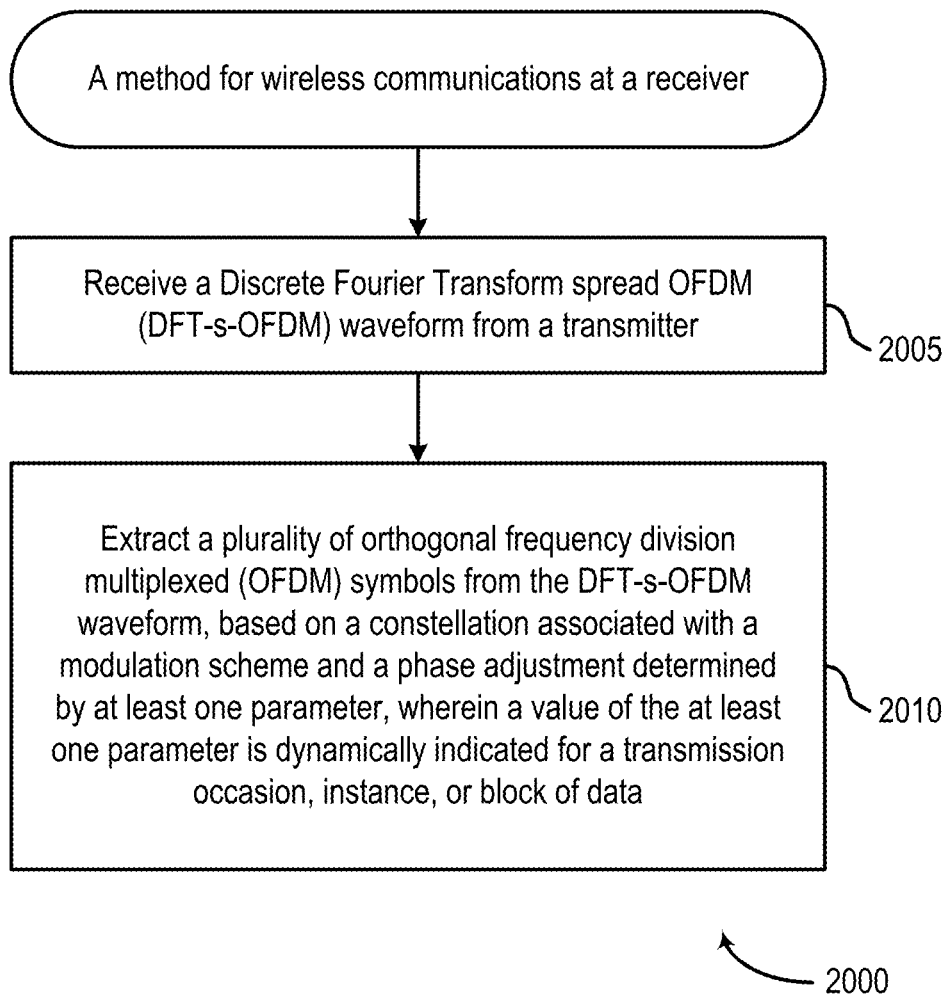
FIG. 20 depicts a method for wireless communications.

FIG. 20 shows an example of a method 2000 of wireless communications at a receiver. In some examples, the receiver is a user equipment, such as a UE 104 of FIGS. 1 and 3. In some examples, the receiver is a network entity, such as a BS 102 of FIGS. 1 and 3, or a disaggregated base station as discussed with respect to FIG. 2.

Method 2000 begins at step 2005 with receiving a Discrete Fourier Transform spread OFDM (DFT-s-OFDM) waveform from a transmitter. In some cases, the operations of this step refer to, or may be performed by, circuitry for receiving and/or code for receiving as described with reference to FIG. 21.

Method 2000 then proceeds to step 2010 with extracting a plurality of orthogonal frequency division multiplexed (OFDM) symbols from the DFT-s-OFDM waveform, based on a constellation associated with a modulation scheme and a phase adjustment determined by at least one parameter, wherein a value of the at least one parameter is dynamically indicated for a transmission occasion, instance, or block of data. In some cases, the operations of this step refer to, or may be performed by, circuitry for extracting and/or code for extracting as described with reference to FIG. 21.

In some aspects, the receiver comprises a user equipment (UE); and a value of the at least one parameter is dynamically indicated via downlink control information (DCI).

In some aspects, the receiver comprises a network entity; and a value of the at least one parameter is dynamically indicated via uplink control information (UCI).

In some aspects, the transmitter comprises a user equipment (UE) and the receiver comprises a UE; and a value of the at least one parameter is dynamically indicated via sidelink control information (SCI).

In some aspects, at least one of a resolution or granularity of the parameter depends on at least one of a modulation order, a size of the constellation, or a shape of the constellation.

In some aspects, at least one of a value of the parameter, a resolution or granularity of the parameter, or whether the phase is adjusted based on the parameter depends on a capability of at least one of the transmitter or the receiver.

In one aspect, method 2000, or any aspect related to it, may be performed by an apparatus, such as communications device 2100 of FIG. 21, which includes various components operable, configured, or adapted to perform the method 2000. Communications device 2100 is described below in further detail.

Note that FIG. 20 is just one example of a method, and other methods including fewer, additional, or alternative steps are possible consistent with this disclosure.

Example Communications Device(s)

FIG. 21 depicts aspects of an example communications device 2100. In some aspects, communications device 2100 is a user equipment, such as UE 104 described above with respect to FIGS. 1 and 3. In some aspects, communications device 2100 is a network entity, such as BS 102 of FIGS. 1 and 3, or a disaggregated base station as discussed with respect to FIG. 2.

The communications device 2100 includes a processing system 2105 coupled to the transceiver 2175 (e.g., a transmitter and/or a receiver). In some aspects (e.g., when communications device 2100 is a network entity), processing system 2105 may be coupled to a network interface 2185 that is configured to obtain and send signals for the communications device 2100 via communication link(s), such as a backhaul link, midhaul link, and/or fronthaul link as described herein, such as with respect to FIG. 2. The transceiver 2175 is configured to transmit and receive signals for the communications device 2100 via the antenna 2180, such as the various signals as described herein. The processing system 2105 may be configured to perform processing functions for the communications device 2100, including processing signals received and/or to be transmitted by the communications device 2100.

The processing system 2105 includes one or more processors 2110. In various aspects, the one or more processors 2110 may be representative of one or more of receive processor 358, transmit processor 364, TX MIMO processor 366, and/or controller/processor 380, as described with respect to FIG. 3. In various aspects, one or more processors 2110 may be representative of one or more of receive processor 338, transmit processor 320, TX MIMO processor 330, and/or controller/processor 340, as described with respect to FIG. 3. The one or more processors 2110 are coupled to a computer-readable medium/memory 2140 via a bus 2170. In certain aspects, the computer-readable medium/memory 2140 is configured to store instructions (e.g., computer-executable code) that when executed by the one or more processors 2110, cause the one or more processors 2110 to perform the method 1300 described with respect to FIG. 13, or any aspect related to it; the method 1400 described with respect to FIG. 14, or any aspect related to it; the method 1500 described with respect to FIG. 15, or any aspect related to it; the method 1600 described with respect to FIG. 16, or any aspect related to it; the method 1700 described with respect to FIG. 17, or any aspect related to it; the method 1800 described with respect to FIG. 18, or any aspect related to it; the method 1900 described with respect to FIG. 19, or any aspect related to it; and the method 2000 described with respect to FIG. 20, or any aspect related to it. Note that reference to a processor performing a function of communications device 2100 may include one or more processors 2110 performing that function of communications device 2100.

In the depicted example, computer-readable medium/memory 2140 stores code (e.g., executable instructions), such as code for generating 2145, code for adjusting 2150, code for transmitting 2155, code for receiving 2160, and code for extracting 2165. Processing of the code for generating 2145, code for adjusting 2150, code for transmitting 2155, code for receiving 2160, and code for extracting 2165 may cause the communications device 2100 to perform the method 1300 described with respect to FIG. 13, or any aspect related to it; the method 1400 described with respect to FIG. 14, or any aspect related to it; the method 1500 described with respect to FIG. 15, or any aspect related to it; the method 1600 described with respect to FIG. 16, or any aspect related to it; the method 1700 described with respect to FIG. 17, or any aspect related to it; the method 1800 described with respect to FIG. 18, or any aspect related to it; the method 1900 described with respect to FIG. 19, or any aspect related to it; and the method 2000 described with respect to FIG. 20, or any aspect related to it.

The one or more processors 2110 include circuitry configured to implement (e.g., execute) the code stored in the computer-readable medium/memory 2140, including circuitry for generating 2115, circuitry for adjusting 2120, circuitry for transmitting 2125, circuitry for receiving 2130, and circuitry for extracting 2135. Processing with circuitry for generating 2115, circuitry for adjusting 2120, circuitry for transmitting 2125, circuitry for receiving 2130, and circuitry for extracting 2135 may cause the communications device 2100 to perform the method 1300 described with respect to FIG. 13, or any aspect related to it; the method 1400 described with respect to FIG. 14, or any aspect related to it; the method 1500 described with respect to FIG. 15, or any aspect related to it; the method 1600 described with respect to FIG. 16, or any aspect related to it; the method 1700 described with respect to FIG. 17, or any aspect related to it; the method 1800 described with respect to FIG. 18, or any aspect related to it; the method 1900 described with respect to FIG. 19, or any aspect related to it; and the method 2000 described with respect to FIG. 20, or any aspect related to it.

Various components of the communications device 2100 may provide means for performing the method 1300 described with respect to FIG. 13, or any aspect related to it; the method 1400 described with respect to FIG. 14, or any aspect related to it; the method 1500 described with respect to FIG. 15, or any aspect related to it; the method 1600 described with respect to FIG. 16, or any aspect related to it; the method 1700 described with respect to FIG. 17, or any aspect related to it; the method 1800 described with respect to FIG. 18, or any aspect related to it; the method 1900 described with respect to FIG. 19, or any aspect related to it; and the method 2000 described with respect to FIG. 20, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 2175 and the antenna 2180 of the communications device 2100 in FIG. 21. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 2175 and the antenna 2180 of the communications device 2100 in FIG. 21.

Example Clauses

Implementation examples are described in the following numbered clauses:

Clause 1: A method for wireless communications at a transmitter, comprising: generating a plurality of orthogonal frequency division multiplexed (OFDM) symbols, based on a constellation associated with a modulation scheme; adjusting a phase of at least one of the OFDM symbols based on at least one parameter that depends on a non-integer multiple of a phase distance between two points on the constellation; generating a Discrete Fourier Transform spread OFDM (DFT-s-OFDM) waveform based on the OFDM symbols after the adjustment; and transmitting the DFT-s-OFDM waveform to a receiver.

Clause 2: The method of Clause 1, wherein the parameter depends on a non-integer multiple of a half of a minimum phase distance between the two points on the constellation.

Clause 3: The method of Clause 2, wherein: the OFDM symbols are mapped to N subcarriers; and the phase adjustment for an OFDM symbol mapped to a kth subcarrier out of the N subcarriers is also based on k.

Clause 4: The method of Clause 3, wherein: the phase adjustment for the OFDM symbol mapped to the kth subcarrier is also based on a symbol offset d.

Clause 5: The method of any one of Clauses 1-4, wherein: the phase adjustment is also based on a phase offset.

Clause 6: The method of any one of Clauses 1-5, wherein the constellation comprises a four-dimensional constellation.

Clause 7: The method of any one of Clauses 1-6, wherein a value of the parameter is based on a size of the constellation.

Clause 8: The method of any one of Clauses 1-7, wherein at least one of a value of the parameter or whether the phase is adjusted based on the parameter depends on at least one of: a type of pulse shaping or spectrum extension applied at the transmitter.

Clause 9: The method of any one of Clauses 1-8, wherein a value of the parameter is based on at least one of: a number of symbols in a data stream from which the OFDM symbols are generated; or time and frequency resources allocated for the data stream.

Clause 10: The method of any one of Clauses 1-9, wherein the at least one parameter is at least one of: determined based on radio resource control (RRC) signaling, selected from a set of predefined parameters, dependent on dynamic parameters of data scheduling, based on a configuration, or based on one or more rules.

Clause 11: The method of any one of Clauses 1-10, wherein at least one of: the adjustment is dynamically activated or deactivated for at least one of uplink data transmission, downlink data transmission, or sidelink data transmission via dynamic waveform switching; or the at least one parameter is changed via dynamic waveform switching.

Clause 12: The method of any one of Clauses 1-11, wherein at least one of a value of the parameter or whether the phase is adjusted based on the parameter depends on a capability of at least one of the transmitter or the receiver.

Clause 13: The method of any one of Clauses 1-12, wherein at least one of a value of the parameter is dynamically indicated for a transmission occasion.

Clause 14: A method for wireless communications at a transmitter, comprising: generating a plurality of orthogonal frequency division multiplexed (OFDM) symbols, based on a constellation associated with a modulation scheme; adjusting a phase of at least one of the OFDM symbols based on at least one parameter that depends on a non-integer multiple of a phase distance between two points on the constellation; generating a cyclic prefix OFDM (CP-OFDM) waveform based on the OFDM symbols after the adjustment; and transmitting the CP-OFDM waveform to a receiver.

Clause 15: The method of Clause 14, wherein the parameter depends on a non-integer multiple of a half of a minimum phase distance between the two points on the constellation.

Clause 16: The method of Clause 15, wherein: the OFDM symbols are mapped to N subcarriers; and the phase adjustment for an OFDM symbol mapped to a kth subcarrier out of the N subcarriers is also based on k to a power of 2 or greater.

Clause 17: The method of Clause 16, wherein: the phase adjustment for the OFDM symbol mapped to the kth subcarrier is also based on a symbol offset d.

Clause 18: The method of any one of Clauses 14-17, wherein: the phase adjustment is also based on a phase offset.

Clause 19: The method of any one of Clauses 14-18, wherein the constellation comprises a four-dimensional constellation.

Clause 20: The method of any one of Clauses 14-19, wherein a value of the parameter is based on a size of the constellation.

Clause 21: The method of any one of Clauses 14-20, wherein at least one of a value of the parameter or whether the phase is adjusted based on the parameter depends on at least one of: a type of pulse shaping or spectrum extension applied at the transmitter.

Clause 22: The method of any one of Clauses 14-21, wherein a value of the parameter is based on at least one of: a number of symbols in a data stream from which the OFDM symbols are generated; or time and frequency resources allocated for the data stream.

Clause 23: The method of any one of Clauses 14-22, wherein the at least one parameter is at least one of: determined based on radio resource control (RRC) signaling, selected from a set of predefined parameters, dependent on dynamic parameters of data scheduling, based on a configuration, or based on one or more rules.

Clause 24: The method of any one of Clauses 14-23, wherein at least one of: the adjustment is dynamically activated or deactivated for at least one of uplink data transmission, downlink data transmission, or sidelink data transmission via dynamic waveform switching; or the at least one parameter is changed via dynamic waveform switching.

Clause 25: The method of any one of Clauses 14-24, wherein at least one of a value of the parameter or whether the phase is adjusted based on the parameter depends on a capability of at least one of the transmitter or the receiver.

Clause 26: The method of any one of Clauses 14-25, wherein at least one of a value of the parameter is dynamically indicated for a transmission occasion.

Clause 27: A method for wireless communications at a transmitter, comprising: generating a plurality of orthogonal frequency division multiplexed (OFDM) symbols, based on a constellation associated with a modulation scheme; adjusting a phase of at least one of the OFDM symbols based on at least one parameter, wherein a value of the at least one parameter is dynamically indicated for a transmission occasion, instance, or block of data; generating a cyclic prefix OFDM (CP-OFDM) waveform based on the OFDM symbols after the adjustment; and transmitting the CP-OFDM waveform to a receiver.

Clause 28: The method of Clause 27, wherein: the transmitter comprises a network entity; and a value of the at least one parameter is dynamically indicated via downlink control information (DCI).

Clause 29: The method of any one of Clauses 27-28, wherein: the transmitter comprises a user equipment (UE); and a value of the at least one parameter is dynamically indicated via uplink control information (UCI).

Clause 30: The method of any one of Clauses 27-29, wherein: the transmitter comprises a user equipment (UE) and the receiver comprises a UE; and a value of the at least one parameter is dynamically indicated via sidelink control information (SCI).

Clause 31: The method of any one of Clauses 27-30, wherein at least one of a resolution or granularity of the parameter depends on at least one of a modulation order, a size of the constellation, or a shape of the constellation.

Clause 32: The method of any one of Clauses 27-31, wherein at least one of a value of the parameter, a resolution or granularity of the parameter, or whether the phase is adjusted based on the parameter depends on a capability of at least one of the transmitter or the receiver.

Clause 33: A method for wireless communications at a transmitter, comprising: generating a plurality of orthogonal frequency division multiplexed (OFDM) symbols, based on a constellation associated with a modulation scheme; adjusting a phase of at least one of the OFDM symbols based on at least one parameter, wherein a value of the at least one parameter is dynamically indicated for a transmission occasion, instance, or block of data; generating a Discrete Fourier Transform spread OFDM (DFT-s-OFDM) waveform based on the OFDM symbols after the adjustment; and transmitting the DFT-s-OFDM waveform to a receiver.

Clause 34: The method of Clause 33, wherein: the transmitter comprises a network entity; and a value of the at least one parameter is dynamically indicated via downlink control information (DCI).

Clause 35: The method of any one of Clauses 33-34, wherein: the transmitter comprises a user equipment (UE); and a value of the at least one parameter is dynamically indicated via uplink control information (UCI).

Clause 36: The method of any one of Clauses 33-35, wherein: the transmitter comprises a user equipment (UE) and the receiver comprises a UE; and a value of the at least one parameter is dynamically indicated via sidelink control information (SCI).

Clause 37: The method of any one of Clauses 33-36, wherein at least one of a resolution or granularity of the parameter depends on at least one of a modulation order, a size of the constellation, or a shape of the constellation.

Clause 38: The method of any one of Clauses 33-37, wherein at least one of a value of the parameter, a resolution or granularity of the parameter, or whether the phase is adjusted based on the parameter depends on a capability of at least one of the transmitter or the receiver.

Clause 39: A method for wireless communications at a receiver, comprising: receiving a Discrete Fourier Transform spread OFDM (DFT-s-OFDM) waveform from a transmitter; and extracting a plurality of orthogonal frequency division multiplexed (OFDM) symbols from the DFT-s-OFDM waveform, based on a constellation associated with a modulation scheme and a phase adjustment determined by at least one parameter that depends on a non-integer multiple of a phase distance between two points on the constellation.

Clause 40: The method of Clause 39, wherein the parameter depends on a non-integer multiple of a half of a minimum phase distance between the two points on the constellation.

Clause 41: The method of Clause 40, wherein: the OFDM symbols are demapped from N subcarriers; and the phase adjustment for an OFDM symbol mapped to a kth subcarrier out of the N subcarriers is also based on k.

Clause 42: The method of Clause 41, wherein: the phase adjustment for the OFDM symbol mapped to the kth subcarrier is also based on a symbol offset d.

Clause 43: The method of any one of Clauses 39-42, wherein: the phase adjustment is also based on a phase offset.

Clause 44: The method of any one of Clauses 39-43, wherein the constellation comprises a four-dimensional constellation.

Clause 45: The method of any one of Clauses 39-44, wherein a value of the parameter is based on a size of the constellation.

Clause 46: The method of any one of Clauses 39-45, wherein at least one of a value of the parameter or whether the phase is adjusted based on the parameter depends on at least one of: a type of pulse shaping or spectrum extension applied at the transmitter.

Clause 47: The method of any one of Clauses 39-46, wherein a value of the parameter is based on at least one of: a number of symbols in a data stream from which the OFDM symbols are generated; or time and frequency resources allocated for the data stream.

Clause 48: The method of any one of Clauses 39-47, wherein the at least one parameter is at least one of: determined based on radio resource control (RRC) signaling, selected from a set of predefined parameters, dependent on dynamic parameters of data scheduling, based on a configuration, or based on one or more rules.

Clause 49: The method of any one of Clauses 39-48, wherein at least one of: the adjustment is dynamically activated or deactivated for at least one of uplink data transmission, downlink data transmission, or sidelink data transmission via dynamic waveform switching; or the at least one parameter is changed via dynamic waveform switching.

Clause 50: The method of any one of Clauses 39-49, wherein at least one of a value of the parameter or whether the phase is adjusted based on the parameter depends on a capability of at least one of the transmitter or the receiver.

Clause 51: The method of any one of Clauses 39-50, wherein at least one of a value of the parameter is dynamically indicated for a transmission occasion.

Clause 52: A method for wireless communications at a receiver, comprising: receiving a cyclic prefix OFDM (CP-OFDM) waveform from a transmitter; and extracting a plurality of orthogonal frequency division multiplexed (OFDM) symbols from the CP-OFDM waveform, based on a constellation associated with a modulation scheme and a phase adjustment determined by at least one parameter that depends on a non-integer multiple of a phase distance between two points on the constellation.

Clause 53: The method of Clause 52, wherein the parameter depends on a non-integer multiple of a half of a minimum phase distance between the two points on the constellation.

Clause 54: The method of Clause 53, wherein: the OFDM symbols are demapped from N subcarriers; and the phase adjustment for an OFDM symbol mapped to a kth subcarrier out of the N subcarriers is also based on k to a power of 2 or greater.

Clause 55: The method of Clause 54, wherein: the phase adjustment for the OFDM symbol mapped to the kth subcarrier is also based on a symbol offset d.

Clause 56: The method of any one of Clauses 52-55, wherein: the phase adjustment is also based on a phase offset.

Clause 57: The method of any one of Clauses 52-56, wherein the constellation comprises a four-dimensional constellation.

Clause 58: The method of any one of Clauses 52-57, wherein a value of the parameter is based on a size of the constellation.

Clause 59: The method of any one of Clauses 52-58, wherein at least one of a value of the parameter or whether the phase is adjusted based on the parameter depends on at least one of: a type of pulse shaping or spectrum extension applied at the transmitter.

Clause 60: The method of any one of Clauses 52-59, wherein a value of the parameter is based on at least one of: a number of symbols in a data stream from which the OFDM symbols are generated; or time and frequency resources allocated for the data stream.

Clause 61: The method of any one of Clauses 52-60, wherein the at least one parameter is at least one of: determined based on radio resource control (RRC) signaling, selected from a set of predefined parameters, dependent on dynamic parameters of data scheduling, based on a configuration, or based on one or more rules.

Clause 62: The method of any one of Clauses 52-61, wherein at least one of: the adjustment is dynamically activated or deactivated for at least one of uplink data transmission, downlink data transmission, or sidelink data transmission via dynamic waveform switching; or the at least one parameter is changed via dynamic waveform switching.

Clause 63: The method of any one of Clauses 52-62, wherein at least one of a value of the parameter or whether the phase is adjusted based on the parameter depends on a capability of at least one of the transmitter or the receiver.

Clause 64: The method of any one of Clauses 52-63, wherein at least one of a value of the parameter is dynamically indicated for a transmission occasion.

Clause 65: A method for wireless communications at a receiver, comprising: receiving a cyclic prefix OFDM (CP-OFDM) waveform from a transmitter; and extracting a plurality of orthogonal frequency division multiplexed (OFDM) symbols from the CP-OFDM waveform, based on a constellation associated with a modulation scheme and a phase adjustment determined by at least one parameter, wherein a value of the at least one parameter is dynamically indicated for a transmission occasion, instance, or block of data.

Clause 66: The method of Clause 65, wherein: the receiver comprises a user equipment (UE); and a value of the at least one parameter is dynamically indicated via downlink control information (DCI).

Clause 67: The method of any one of Clauses 65-66, wherein: the receiver comprises a network entity; and a value of the at least one parameter is dynamically indicated via uplink control information (UCI).

Clause 68: The method of any one of Clauses 65-67, wherein: the transmitter comprises a user equipment (UE) and the receiver comprises a UE; and a value of the at least one parameter is dynamically indicated via sidelink control information (SCI).

Clause 69: The method of any one of Clauses 65-68, wherein at least one of a resolution or granularity of the parameter depends on at least one of a modulation order, a size of the constellation, or a shape of the constellation.

Clause 70: The method of any one of Clauses 65-69, wherein at least one of a value of the parameter, a resolution or granularity of the parameter, or whether the phase is adjusted based on the parameter depends on a capability of at least one of the transmitter or the receiver.

Clause 71: A method for wireless communications at a receiver, comprising: receiving a Discrete Fourier Transform spread OFDM (DFT-s-OFDM) waveform from a transmitter; and extracting a plurality of orthogonal frequency division multiplexed (OFDM) symbols from the DFT-s-OFDM waveform, based on a constellation associated with a modulation scheme and a phase adjustment determined by at least one parameter, wherein a value of the at least one parameter is dynamically indicated for a transmission occasion, instance, or block of data.

Clause 72: The method of Clause 71, wherein: the receiver comprises a user equipment (UE); and a value of the at least one parameter is dynamically indicated via downlink control information (DCI).

Clause 73: The method of any one of Clauses 71-72, wherein: the receiver comprises a network entity; and a value of the at least one parameter is dynamically indicated via uplink control information (UCI).

Clause 74: The method of any one of Clauses 71-73, wherein: the transmitter comprises a user equipment (UE) and the receiver comprises a UE; and a value of the at least one parameter is dynamically indicated via sidelink control information (SCI).

Clause 75: The method of any one of Clauses 71-74, wherein at least one of a resolution or granularity of the parameter depends on at least one of a modulation order, a size of the constellation, or a shape of the constellation.

Clause 76: The method of any one of Clauses 71-75, wherein at least one of a value of the parameter, a resolution or granularity of the parameter, or whether the phase is adjusted based on the parameter depends on a capability of at least one of the transmitter or the receiver.

Clause 77: An apparatus, comprising: a memory comprising executable instructions; and a processor configured to execute the executable instructions and cause the apparatus to perform a method in accordance with any one of Clauses 1-76.

Clause 78: An apparatus, comprising means for performing a method in accordance with any one of Clauses 1-76.

Clause 79: A non-transitory computer-readable medium comprising executable instructions that, when executed by a processor of an apparatus, cause the apparatus to perform a method in accordance with any one of Clauses 1-76.

Clause 80: A computer program product embodied on a computer-readable storage medium comprising code for performing a method in accordance with any one of Clauses 1-76.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a transmitter, comprising: a memory comprising computer-executable instructions; and one or more processors configured to execute the computer-executable instructions and cause the apparatus to:
generate a plurality of orthogonal frequency division multiplexed (OFDM) symbols, based on a constellation associated with a modulation scheme;
adjust a phase of at least one of the OFDM symbols based on at least one parameter that depends on a non-integer multiple of a phase distance between two points on the constellation;
generate a Discrete Fourier Transform spread OFDM (DFT-s-OFDM) waveform based on the OFDM symbols after the adjustment; and
transmit the DFT-s-OFDM waveform to a receiver.

2. The apparatus of claim 1, wherein the parameter depends on a non-integer multiple of a half of a minimum phase distance between the two points on the constellation.

3. The apparatus of claim 2, wherein: the OFDM symbols are mapped to N subcarriers; and the phase adjustment for an OFDM symbol mapped to a kth subcarrier out of the N subcarriers is also based on k.

4. The apparatus of claim 3, wherein: the phase adjustment for the OFDM symbol mapped to the kth subcarrier is also based on a symbol offset d.

5. The apparatus of claim 1, wherein: the phase adjustment is also based on a phase offset.

6. The apparatus of claim 1, wherein the constellation comprises a four-dimensional constellation.

7. The apparatus of claim 1, wherein a value of the parameter is based on a size of the constellation.

8. The apparatus of claim 1, wherein at least one of a value of the parameter or whether the phase is adjusted based on the parameter depends on at least one of: a type of pulse shaping or spectrum extension applied at the transmitter.

9. The apparatus of claim 1, wherein a value of the parameter is based on at least one of: a number of symbols in a data stream from which the OFDM symbols are generated; or time and frequency resources allocated for the data stream.

10. The apparatus of claim 1, wherein the at least one parameter is at least one of: determined based on radio resource control (RRC) signaling, selected from a set of predefined parameters, dependent on dynamic parameters of data scheduling, based on a configuration, or based on one or more rules.

11. The apparatus of claim 1, wherein at least one of: the adjustment is dynamically activated or deactivated for at least one of uplink data transmission, downlink data transmission, or sidelink data transmission via dynamic waveform switching; or the at least one parameter is changed via dynamic waveform switching.

12. The apparatus of claim 1, wherein at least one of a value of the parameter or whether the phase is adjusted based on the parameter depends on a capability of at least one of the transmitter or the receiver.

13. The apparatus of claim 1, wherein at least one of a value of the parameter is dynamically indicated for a transmission occasion.

14. An apparatus for wireless communication at a transmitter, comprising: a memory comprising computer-executable instructions; and one or more processors configured to execute the computer-executable instructions and cause the apparatus to:
generate a plurality of orthogonal frequency division multiplexed (OFDM) symbols, based on a constellation associated with a modulation scheme;
adjust a phase of at least one of the OFDM symbols based on at least one parameter that depends on a non-integer multiple of a phase distance between two points on the constellation;
generate a cyclic prefix OFDM (CP-OFDM) waveform based on the OFDM symbols after the adjustment; and
transmit the CP-OFDM waveform to a receiver.

15. The apparatus of claim 14, wherein the parameter depends on a non-integer multiple of a half of a minimum phase distance between the two points on the constellation.

16. The apparatus of claim 15, wherein: the OFDM symbols are mapped to N subcarriers; and the phase adjustment for an OFDM symbol mapped to a kth subcarrier out of the N subcarriers is also based on k to a power of 2 or greater.

17. The apparatus of claim 16, wherein: the phase adjustment for the OFDM symbol mapped to the kth subcarrier is also based on a symbol offset d.

18. The apparatus of claim 14, wherein: the phase adjustment is also based on a phase offset.

19. The apparatus of claim 14, wherein the constellation comprises a four-dimensional constellation.

20. The apparatus of claim 14, wherein a value of the parameter is based on a size of the constellation.

21. The apparatus of claim 14, wherein at least one of a value of the parameter or whether the phase is adjusted based on the parameter depends on at least one of: a type of pulse shaping or spectrum extension applied at the transmitter.

22. The apparatus of claim 14, wherein a value of the parameter is based on at least one of: a number of symbols in a data stream from which the OFDM symbols are generated; or time and frequency resources allocated for the data stream.

23. The apparatus of claim 14, wherein the at least one parameter is at least one of: determined based on radio resource control (RRC) signaling, selected from a set of predefined parameters, dependent on dynamic parameters of data scheduling, based on a configuration, or based on one or more rules.

24. The apparatus of claim 14, wherein at least one of: the adjustment is dynamically activated or deactivated for at least one of uplink data transmission, downlink data transmission, or sidelink data transmission via dynamic waveform switching; or the at least one parameter is changed via dynamic waveform switching.

25. The apparatus of claim 14, wherein at least one of a value of the parameter or whether the phase is adjusted based on the parameter depends on a capability of at least one of the transmitter or the receiver.

26. The apparatus of claim 14, wherein at least one of a value of the parameter is dynamically indicated for a transmission occasion.

27. An apparatus for wireless communication at a transmitter, comprising: a memory comprising computer-executable instructions; and one or more processors configured to execute the computer-executable instructions and cause the apparatus to:
  generate a plurality of orthogonal frequency division multiplexed (OFDM) symbols, based on a constellation associated with a modulation scheme;
  adjust a phase of at least one of the OFDM symbols based on at least one parameter, wherein a value of the at least one parameter is dynamically indicated for a transmission occasion, instance, or block of data;
  generate a cyclic prefix OFDM (CP-OFDM) waveform based on the OFDM symbols after the adjustment; and
  transmit the CP-OFDM waveform to a receiver.

28. The apparatus of claim 27, wherein: the transmitter comprises a network entity; and a value of the at least one parameter is dynamically indicated via downlink control information (DCI).

29. The apparatus of claim 27, wherein: the transmitter comprises a user equipment (UE); and a value of the at least one parameter is dynamically indicated via uplink control information (UCI).

30. The apparatus of claim 27, wherein: the transmitter comprises a user equipment (UE) and the receiver comprises a UE; and a value of the at least one parameter is dynamically indicated via sidelink control information (SCI).

31. The apparatus of claim 27, wherein at least one of a resolution or granularity of the parameter depends on at least one of a modulation order, a size of the constellation, or a shape of the constellation.

32. The apparatus of claim 27, wherein at least one of a value of the parameter, a resolution or granularity of the parameter, or whether the phase is adjusted based on the parameter depends on a capability of at least one of the transmitter or the receiver.

33. An apparatus for wireless communication at a transmitter, comprising: a memory comprising computer-executable instructions; and one or more processors configured to execute the computer-executable instructions and cause the apparatus to:
  generate a plurality of orthogonal frequency division multiplexed (OFDM) symbols, based on a constellation associated with a modulation scheme;
  adjust a phase of at least one of the OFDM symbols based on at least one parameter, wherein a value of the at least one parameter is dynamically indicated for a transmission occasion, instance, or block of data;
  generate a Discrete Fourier Transform spread OFDM (DFT-s-OFDM) waveform based on the OFDM symbols after the adjustment; and
  transmit the DFT-s-OFDM waveform to a receiver.

34. The apparatus of claim 33, wherein: the transmitter comprises a network entity; and a value of the at least one parameter is dynamically indicated via downlink control information (DCI).

35. The apparatus of claim 33, wherein: the transmitter comprises a user equipment (UE); and a value of the at least one parameter is dynamically indicated via uplink control information (UCI).

36. The apparatus of claim 33, wherein: the transmitter comprises a user equipment (UE) and the receiver comprises a UE; and a value of the at least one parameter is dynamically indicated via sidelink control information (SCI).

37. The apparatus of claim 33, wherein at least one of a resolution or granularity of the parameter depends on at least one of a modulation order, a size of the constellation, or a shape of the constellation.

38. The apparatus of claim 33, wherein at least one of a value of the parameter, a resolution or granularity of the parameter, or whether the phase is adjusted based on the parameter depends on a capability of at least one of the transmitter or the receiver.

* * * * *